United States Patent [19]

Yie

[11] Patent Number: 5,092,362
[45] Date of Patent: Mar. 3, 1992

[54] ON-OFF VALVES AND PRESSURE REGULATORS FOR HIGH-PRESSURE FLUIDS

[75] Inventor: Gene G. Yie, Auburn, Wash.

[73] Assignee: Fluidyne Corporation, Auburn, Wash.

[21] Appl. No.: 630,560

[22] Filed: Dec. 20, 1990

[51] Int. Cl.$^5$ ............ F16K 11/14; F16K 11/22
[52] U.S. Cl. ............ 137/596.1; 137/868; 137/881; 239/526; 239/572
[58] Field of Search ............ 137/596.1, 868, 881; 239/63, 526, 572

[56] References Cited

U.S. PATENT DOCUMENTS

| | | |
|---|---|---|
| 3,672,575 | 6/1972 | Hinrichs . |
| 3,885,739 | 5/1975 | Tuttle ............ 239/526 X |
| 4,216,907 | 8/1980 | Fuller ............ 239/526 X |
| 4,784,330 | 11/1988 | Hammelmann ............ 239/526 |

OTHER PUBLICATIONS

One page advertisement from Hydro Manufacturing & Sales, P.O. Box 308, Missouri City, Texas 77459.
Applicant's three sketches describing hand-operated waterjet lance sold by Applicant on Jul. 7, 1989.

Primary Examiner—Gerald A. Michalsky
Attorney, Agent, or Firm—Speckman & Pauley

[57] ABSTRACT

A fast-actuating on-off valve and pressure regulator particularly well-suited for use with high-pressure incompressible fluids. An actuator, manually-operated or powered, provides a linear push-pull force to a valve stem assembly mounted inside a valve cavity having a fluid inlet and one or more fluid outlets which are arranged axially and concentric with respect to the valve stem. The valve stem assembly includes a valve stem that has a shoulder at one end, with or without an extension. One or more stem springs are positioned concentrically with respect to the valve stem and are capable of sliding along the valve stem and the extension of the valve stem. The valve stem assembly includes one or more stem collars each having a capped end with a central hole to engage the valve stem, a cylindrical cavity to house the stem shoulder, and a threaded portion engageable with a valve poppet. Each valve poppet has a threaded end engageable with the stem collar and a sealing end to engage with a fluid outlet centrally positioned within a valve seat or a valve poppet. The end of the valve stem can engage a power piston of an actuator or a valve trigger of a manually-operated actuator to allow sliding motion along the valve stem assembly for opening or closing the fluid outlets and thus controlling fluid flow or for regulating fluid pressure.

27 Claims, 9 Drawing Sheets

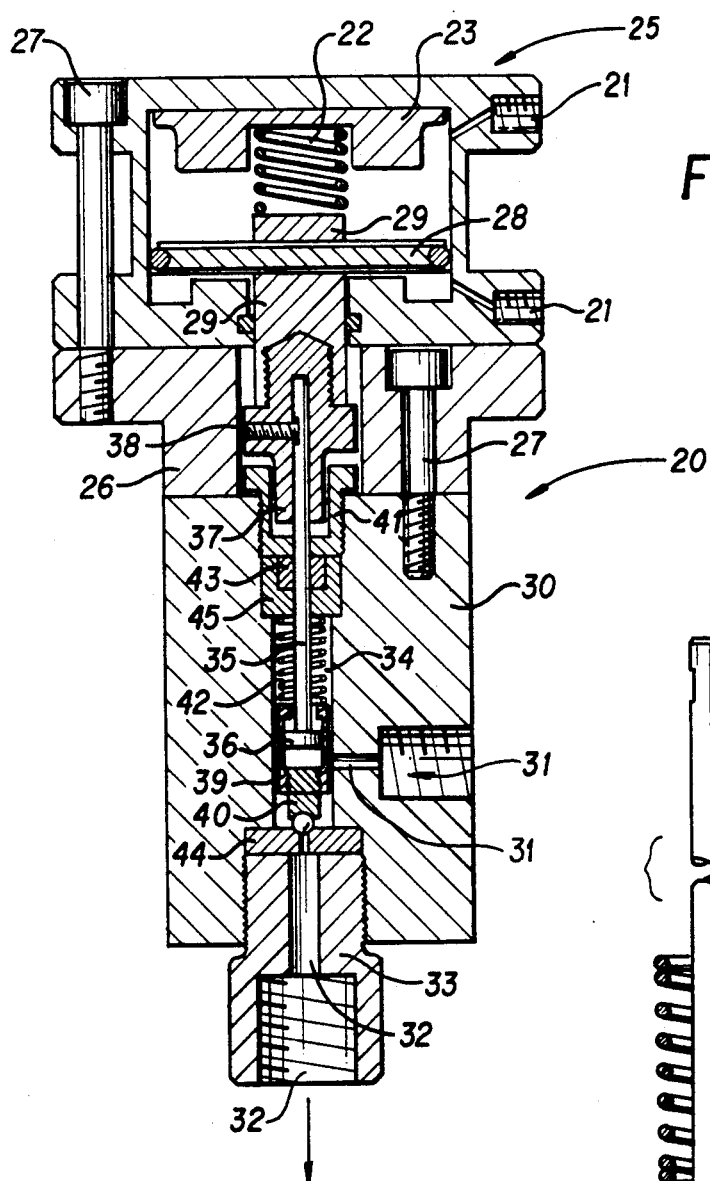
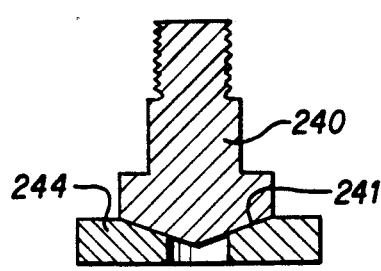
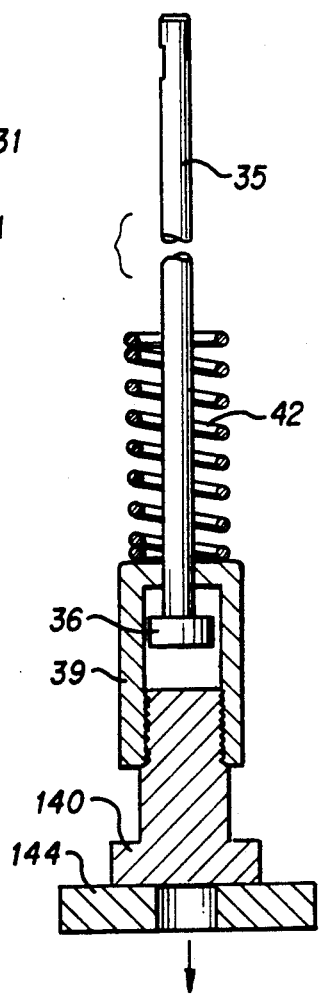
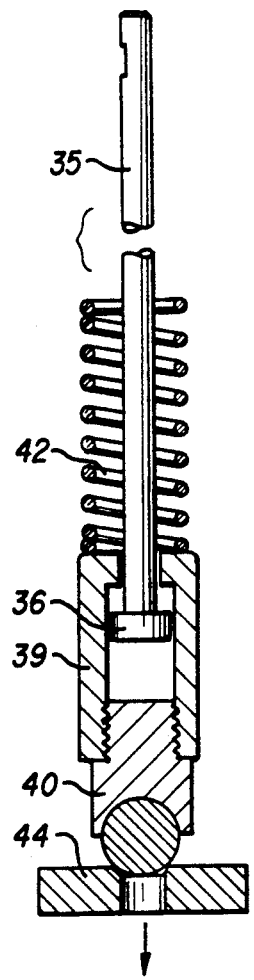
FIG. 1
FIG. 3A   FIG. 3   FIG. 2

ON-OFF VALVES AND PRESSURE REGULATORS FOR HIGH-PRESSURE FLUIDS

BACKGROUND OF THE INVENTION

Valves are commonly used to completely or partially stop fluid flow within a system. A wide variety of valves having various sizes, pressure capabilities, and modes of operation are used in conventional systems. As the working fluid pressure is increased, the selection of flow control valves is reduced due to difficult to achieve fluid sealing requirements. As the working fluid pressure is increased to relatively high values, such as 10,000 psi, the valve selection is further reduced and many conventional valves, such as gate valves, butterfly valves, cock valves, globe valves, and ball valves, are inoperable for such relatively high pressures since the fluid sealing requirements become extremely difficult to achieve and due to high stresses created by such high working fluid pressures.

Conventional stem valves and needle valves are often used with such relatively high working fluid pressures. In such stem valves and needle valves, a hardened valve stem is raised or lowered against a fluid passage having a circular cross section, or a circular valve seat. In some conventional valves, the valve stem must be rotated in order to open and close the valve. In other conventional valves, the valve stem slides up and down to open or close a plug within a seat of a fluid passage. Such conventional valve stems extend outside of the valve cavity and are exposed so that suitable forces can be applied to move the valve stem.

Conventional stem valves and needle valves are available for handling fluids at working pressures in excess of 60,000 psi, and are reliable for such service only if the valve stems and needles of such conventional valves, and their mating valve seats, are made of a hardened material which is capable of withstanding high stresses and high fluid friction.

Components of conventional stem valves or needle valves do not move fast enough when the valve is required to operate in an on-off mode. Since such conventional valves are too slow, external forces must be applied to the valve stem so that it slides to quickly open or close the fluid passage. Depending upon the operating conditions, such external force can be applied manually or with power devices. Conventional pneumatic or hydraulic actuators can be used to provide the linear force necessary to push and pull the valve stem. Such actuators use potential energy from compressed air, compressed gases, pressurized oil or another suitable fluid to move a sealed piston having a piston rod connected to the valve stem. Conventional actuator pistons have a surface area considerably larger than the cross-sectional area of the valve stem. With the increased surface area of the actuator piston, much lower pressures can be used to raise or lower the valve stem which is exposed to and acting against the relatively high working fluid pressure. For example, if the valve stem has an outside diameter of 0.25 inches and the fluid pressure inside the valve body is 60,000 psi, the force applied by the fluid to the valve stem is product of the cross-sectional area of the valve stem and the fluid pressure, or 2,940 lb$_f$. Thus, in order to move the valve stem, a greater force must be applied at the opposite end or actuator end of the valve stem. Also, when the working fluid pressure is relatively high, a frictional force or gripping force is also applied to the valve stem seal assembly. Thus, relatively large sized pneumatic actuators are necessary to provide the force required to move the valve stem. For example, if compressed air is at a pressure of 70 psi, a pneumatic actuator having an air piston of 7.5 inches in diameter is required to translate into a 3,000 lb$_f$ linear force. A pneumatic actuator having an air piston with 7.5 inches in diameter is relatively large, bulky and heavy. Thus, it is apparent that an on-off valve having a valve stem with a relatively small diameter is advantageous since such valve stem requires a smaller actuator when dealing with relatively high working fluid pressures. However, such relatively slim valve stems must be designed to handle stresses involved and thus require high-cost materials, which increases the overall cost of the valve. A valve according to this invention overcomes such disadvantages while maintaining the capability of operating with relatively high working fluid pressures.

Due to recent advances in water jet technology, high water pressures are conventionally available at levels between 10,000 psi to 60,000 psi. In some conventional systems, a manually operated valve is used to control the flow of the high pressure water. Such manually operated conventional valves must handle water pressures up to approximately 35,000 psi. To open and close a fluid port at such high pressure levels requires a high magnitude force that causes fatigue when operated by human hands and the like. The valve according to this invention can be manually operated since such valves are compact, lightweight and relatively easy to operate, even at such very high working fluid pressures.

High pressure water jet operations also require on-off valves which are capable of handling high pressure water at relatively high flow rates. At such relatively high flow rates, the on-off valves are susceptible to shock waves and fluid hammer effects and thus are difficult to design and manufacture. At water pressures of 10,000 psi or greater, quick opening and closing of a relatively large valve port can be very damaging to system components. In such systems, sequential operation of multiple valves with smaller ports is required for safe operation of the system. Sequential operation of multiple valves is common in hydraulic systems. The valve according to one embodiment of this invention is compact and has multiple fluid outlets that are sequentially operated to provide smooth pressure equalization or fluid stoppage. The valve according to this invention can handle such relatively high pressure incompressible fluids at such relatively high flow rates.

In water jet operations, it is also important to regulate water pressure at the discharge of a pump or the water pressure in a piping system. Regulating the pump discharge pressure is also a concern in many other fluid systems. At normal fluid pressures, the system pressure is maintained with conventional fluid pressure regulators. Such conventional pressure regulators vary in design and are basically automatic on-off valves with built-in pressure sensing capabilities to avoid overpressurization by discharging a certain amount of fluid when necessary. When the fluid is a gas, relieving the pressure is more easily accomplished than when the fluid is a liquid, since only a single opened valve is required to discharge a certain amount of the fluid. However, with incompressible fluids, such as oil and water, the relieving procedure is more difficult, particularly at relatively high pressures. Due to the high pressure, the pressure relief port of a regulator must be either fully opened or fully closed or the valve poppet and valve seat will quickly and severely erode. The flow rate of an incompressible fluid through an orifice is directly related to the cross-sectional area of the orifice. Thus, partial opening of a valve for pressure regulation cannot be applied to incompressible fluids. Conventional single-port pressure regulators for high pressure water applications have many disadvantages, particularly in reliability and sensitivity. Frequent pounding of the valve poppet against a valve seat destroys the seating capabilities within a short period of time. The pressure drop that occurs when a regulator is open is often so great that conventional regulators generate pressure spikes and shocks that damage system components. Also, conventional regulators do not respond to relatively slight pressure variations since they have poor sensitivity to system pressure fluctuations. The valve of this invention is designed to provide an improved, multiple-port pressure regulator which is particularly suitable for use with incompressible fluids at relatively high pressures.

It is thus one object of this invention to provide an on-off valve capable of handling incompressible fluids, such as water and oil, at high pressures in excess of 10,000 psi.

It is another object of this invention to provide an on-off valve which can be operated with reduced forces applied to the valve stem even at relatively high fluid pressures, with minimum shock effect in a fluid piping system.

It is another object of this invention to provide a pressure regulator compatible with incompressible fluids, such as water and oil, at high pressures with high flow capabilities, reliability and sensitivity.

BRIEF DESCRIPTION OF THE DRAWINGS

Further features of this invention will be apparent from the following more detailed description taken in conjunction with the drawings wherein:

FIG. 1 is a partial cross-sectional view of an on-off valve for controlling fluid flow at high working pressures, according to one embodiment of this invention;

FIG. 2 is a partial cross-sectional view of a valve stem assembly showing the relationship of the valve stem, sliding stem spring, sliding stem collar and a threaded ball poppet and valve seat arrangement, according to one preferred embodiment of this invention;

FIG. 3 is a partial cross-sectional view of another valve stem assembly having a detachable disk poppet and associated flat valve seat, according to another embodiment of this invention;

FIG. 3A is a cross-sectional view of a conical disk poppet and conically mated valve seat, which is interchangeable with the arrangement shown in FIG. 3, according to another embodiment of this invention;

DESCRIPTION OF PREFERRED EMBODIMENTS

Figure 4:
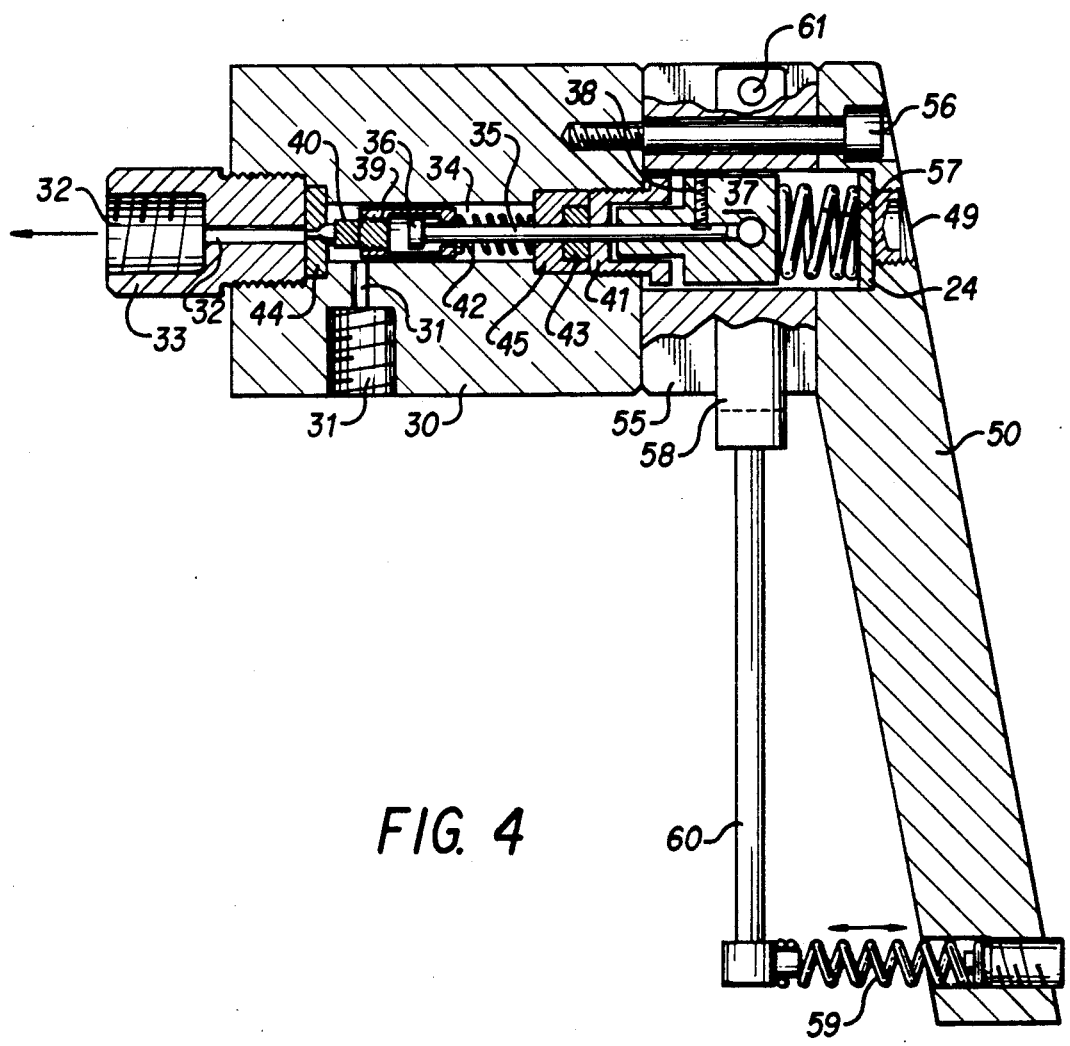
FIG. 4 is a partial cross-sectional view of a manually-operated high pressure fluid, on-off valve, according to another embodiment of this invention.

Referring to FIG. 1, this invention relates to a unique valving arrangement for opening and closing a port under high fluid pressures between about 10,000 psi and about 60,000 psi, and thus controlling fluid flow. FIG. 1 shows a partial cross-sectional view of a complete valve assembly 20 according to one embodiment of this invention, wherein pneumatic actuator 25 provides the necessary forces to operate valve assembly 20. As shown in FIG. 1, valve assembly 20 comprises a valving arrangement wherein cylindrical valve stem 35 has one cylindrical end and an opposite end which forms stem shoulder 36. Stem collar 39 is capable of sliding in a linear fashion with respect to cylindrical valve stem 35. Valve poppet 40 is threadedly engageable with a downstream end of stem collar 39. Stem spring 42 is positioned adjacent an upstream end of stem collar 39, which is opposite the downstream end of stem collar 39. As used throughout this specification and in the claims, the terms "upstream" and "downstream" are relative to flow of the high pressure fluid through valve assembly 20, as shown in FIG. 1 by the arrow near fluid outlet 32. For example, as shown in FIG. 1, the top of valve assembly 20 generally relates to "upstream" whereas the bottom of valve assembly 20 generally relates to "downstream". Thus, for example, actuator adapter 26 is considered to be upstream with respect to valve body 30, as shown in FIG. 1.

In the complete valve assembly 20 as shown in FIG. 1, valve stem 35 and the other components of the valve stem assembly are positioned within cylindrical cavity 34 of valve body 30. According to one preferred embodiment of this invention, valve body 30 is generally rectangular in external shape and constructed of a high-strength steel or alloy metal. It is apparent that valve body 30 can have any other suitable external shape. Side fluid inlet 31 and end fluid outlet 32 are positioned within valve body 30 and are in communication with each other. Pneumatic actuator 25 is secured with respect to valve body 30 through actuator adapter 26 and tie bolts 27, preferably two tie bolts 27. Pneumatic actuator 25 comprises piston 28 which is connected to piston rod 29. Piston rod 29 is moved in a linear fashion, up and down, with a pressurized fluid such as compressed air flowing in and out of a plurality of ports 21, preferably two ports 21. As shown in FIG. 1, lower port 21 is for admitting compressed air to raise piston 28 and upper port 21 is for admitting compressed air to lower piston 28. An upstream end of piston rod 29 abuts a downstream end of spring 22, which is preferably a relatively stiff cushion spring. Damper 23, which acts as a bumper, is positioned between and in contact with an upstream end of spring 22 and an inside wall of a body portion of pneumatic actuator 25, as shown in FIG. 1. Damper 23 is preferably constructed of a plastic or other resilient material for absorbing shock loads. A plurality of springs 22 can be positioned similar to the single spring 22 as shown in FIG. 1, to provide sufficient force on piston 28 and piston rod 29 and thus a normally closed operation of valve assembly 20, such that compressed air is admitted into only lower port 21 for raising piston 28, which opens valve assembly 20.

Also as shown in FIG. 1, a downstream end of piston rod 29 is connected to an upstream end of valve stem anchor 37. In one preferred embodiment according to this invention, such connection comprises valve stem anchor 37 having an externally threaded portion and piston 29 having a mating cavity with engageable internal threads. Valve stem anchor 37 is preferably cylindrical in shape and has a central bore to accommodate valve stem 35. As shown in FIG. 1, a portion of valve stem 35 within valve stem anchor 37 has a flat portion on which set screw 38 engages. Set screw 38 is threadedly engaged within valve stem anchor 37. Seal support 41 supports stem seal 43 and seal cage 45. Seal support 41 is used to guide the up and down linear movement of valve stem anchor 37 and thus centers valve stem 35 and avoids relatively high bending stresses on valve stem 35. Stem seal 43, seal cage 45 and seal support 41 are mounted at an upstream end of cavity 34 of valve body 30. Valve stem 35 is free to slide through the central holes of stem seal 43, seal cage 45 and seal support 41.

Seal cage 45 is an important aspect of this invention, particularly as the working fluid pressure is increased. Seal cage 45 helps prevent the high pressure working fluid from leaking upstream into the cavity within actuator adapter 26. Furthermore, seal cage 45 provides easy access to stem seal 43 for removal and maintenance purposes. Without seal cage 45, stem seal 43 is tightly mounted within valve body 30 and thus to remove stem seal 43, it is necessary to remove all components upstream and downstream of valve stem 35. In such disassembled condition, stem seal 43 would be removed from its mounted position within valve body 30 by either pushing stem seal 43 with a tool within valve cavity 34, in an upstream direction, or pulling stem seal 43 in an upstream direction with a hooked-end tool which must be fished through the central through hole of stem seal 43 when valve stem 35 is removed. However, since seal cage 45 is mounted within valve body 30 so that it can be easily removed, for example by inverting valve body 30 and allowing seal cage 45 to fall out due to gravitational forces, stem seal 43 can more easily be replaced by simply removing only those components upstream of stem seal 43. With seal cage 45, it is not necessary to remove valve stem 35 to provide access to or replace stem seal 43. Stem seal 43 is tightly mounted within seal cage 45, according to one preferred embodiment of this invention.

A downstream end of cavity 34 is sealed by valve seat 44 which is mounted between a shoulder of valve body 30 and outlet adapter 33, which is preferably threaded into valve body 30 at cavity 34. In one preferred embodiment according to this invention, valve seat 44 has a central discharge port which is opened and closed by valve poppet 40.

Also shown in FIG. 1, the end of valve stem 35 having stem shoulder 36 is positioned within cavity 34 and inside cylindrical stem collar 39. Stem collar 39 forms a shoulder and has a central through hole at an upstream end, and has a threaded hole at a downstream end. The threaded hole at the downstream end engages with external threads on valve poppet 40, in one preferred embodiment according to this invention. With valve poppet 40 threaded into stem collar 39, stem collar 39 locks together valve stem 35 and valve poppet 40, and yet valve stem 35 is free to slide within a defined distance. This is a very important aspect of this invention, as discussed below. Stem spring 42 acts as a compression spring above stem collar 39 and around valve stem 35. Stem spring 42 provides a constant downward force against stem collar 39 such that valve poppet 40 is constantly forced downward toward valve seat 44, regardless of the position of valve stem 35. This is an important aspect of this invention which provides a "soft contact" between valve poppet 40 and valve seat 44. Such soft contact provides a relatively long life of all valve components of this invention, as compared to other conventional valves. The length of valve stem 35 and stem collar 39 are calculated such that the downstream end of valve stem 35 having stem shoulder 36 never contacts the upstream end of valve poppet 40 during operation of pneumatic actuator 25. Thus, the downward force from pneumatic actuator 25, for closing valve assembly 20, is never transmitted to valve poppet 40.

In one preferred embodiment of this invention, as compressed air is introduced into upper port 21 of pneumatic actuator 25, piston 28 and valve stem 35 both move to a bottom dead center position. With stem spring 42, valve poppet 40 contacts valve seat 44 before valve stem 35 reaches its end of travel. In such position, valve assembly 20 is closed. With pressurized working fluid within cavity 34, the fluid exerts forces to both valve stem 35 and valve poppet 40. The fluid force on valve stem 35 is less than the force from pneumatic actuator 25, so that valve stem 35 does not move in an upstream direction. The fluid force exerted on valve poppet 40 assists in maintaining the seal between valve poppet 40 and the discharge port of valve seat 44. To open valve assembly 20 from the closed position, compressed air is introduced into lower port 2 of pneumatic actuator 25, which raises piston 28 and thus valve stem 35. As valve stem 35 moves in an upstream direction, stem shoulder 36 engages stem collar 39 and thus lifts valve poppet 40 and opens the discharge port of valve seat 44. As soon as valve poppet 40 clears discharge port of valve seat 44, the fluid force which holds valve poppet 40 within valve seat 44 is overcome and the fluid pushes valve stem 35 in an upstream direction. Thus, a sufficient cushion or dampening effect, through spring 22 and damper 23, as previously discussed, must be provided to stop piston 28 and thus avoid damage to pneumatic actuator 25. It is apparent that the forces from pneumatic actuator 25 are exerted on valve stem 35 primarily in a tension mode and not a compression or bending mode. Thus, a relatively slim or slender valve stem 35, as compared to conventional valve stems, can be safely used. The relatively slim valve stem 35 of this invention has a small cross-sectional area and thus the forces exerted on valve stem 35 from the pressurized working fluid are relatively small and the magnitude of the force required to close the valve is also relatively small, as compared to forces required with conventional valves.

Referring now to FIG. 2, an enlarged partial cross-sectional view of the valve stem assembly according to this invention is shown. Valve poppet 40 is shown as a ball poppet which is constructed, for example, by welding a high-precision steel or carbide sphere to a threaded stud. Such valve poppet 40, as shown in FIG. 2, has a unique advantage of being able to close a port of predetermined diameter such that the fluid forces exerted on the poppet can be calculated with a high degree of accuracy. The hold down force for the poppet is compared to the lifting force required for valve stem 35, from the fluid, for determining the optimum design of pneumatic actuator 25 and other components of valve assembly 20. Valve poppet 40 also provides little interference with fluid flow and thus has a prolonged service life. In addition to hardened steel and various grades of carbide, the sphere of the ball poppet according to this invention can be constructed of relatively hard ceramics. Such ceramic sphere can be cemented to the threaded steel stud. According to this invention, valve seat 44 and valve poppet 40 can be easily replaced when such parts wear down.

FIG. 3 shows another embodiment of valve poppet 40, according to one embodiment of this invention, which is shown as disc poppet 140. A flat and smooth sealing surface 141 is mated with a flat valve seat 144. Disk poppet 140 can operate under higher working fluid pressures than valve poppet 40 or the ball poppet, as shown in FIG. 1, since the poppet seating force is distributed over a greater surface area than valve poppet 40 as shown in FIG. 1. Thus, deformation of disk poppet 140 or valve seat 144, as shown in FIG. 3 is less likely to occur. However, since disk poppet 140 has such a relatively large sealing area, it is more difficult to calculate the magnitude of the fluid hold down force on disk poppet 140 since the flatness of the mating surfaces and the edge conditions of disk poppet 140 are important factors in determining such force.

FIG. 3A shows disk poppet 240 according to yet another embodiment of this invention. As shown in FIG. 3A, disk poppet 240 has a conical sealing surface 241 that mates with a compatible conically shaped valve seat 244. Conical disk poppet 240 can be machined with high accuracy such that the line or circle of contact with valve seat 244 can be calculated with more accuracy, as compared to flat disk poppet 140, as shown in FIG. 3. Such calculation is an important aspect of this invention since the design of pneumatic actuator 25 and thus the operation of valve assembly 20 depends on the magnitude of force created by the fluid on valve stem 35 and valve poppet 40, 140 or 240. If the force from the fluid on valve stem 35 is constantly greater than the fluid force which holds down valve poppet 40, 140 or 240, which happens when the diameter of valve stem 35 is greater than the diameter of the contact circle between ball valve poppet 40 and valve seat 44, as shown in FIGS. 1 and 2, then a loss or reduction of compressed air in pneumatic actuator 25 causes valve assembly 20 to abruptly open. If the diameter of the exit port of valve seat 44, 144 or 244 is considerably larger than the diameter of valve stem 35, then the force required to open valve assembly 20 may be considerable and thus require a more powerful pneumatic actuator 25. Such aspects must be carefully considered when designing optimum valve assemblies 20 for different valve applications and fluid conditions. The various valve poppets 40, 140 and 240 according to this invention allows construction of on-off valves specifically for a given application, without altering the entire valve assembly 20 and thus the entire cost of valve assembly 20. Also, various valve stems 35 can be used under different fluid conditions and thus also offer significant variations of this invention.

Referring to FIG. 4, a partial cross-sectional view of valve assembly 20, according to another embodiment of this invention, shows a relatively high pressure on-off valve that is manually operated instead of operated by a pneumatic actuator, as shown in FIG. 1. In comparison with FIG. 1, the embodiment shown in FIG. 4 has a handle and a trigger mechanism that replaces pneumatic actuator 25. The handle and trigger mechanism is used to translate the linear force to valve stem 35. In such embodiment, the upstream end of valve stem 35 is centrally positioned within cylindrical valve stem anchor 37. Valve stem anchor 37 is free to slide within a cylindrical cavity of handle adapter 55 which connects valve body 30 to the handle by two tie bolts 56. Valve stem anchor 37 has either one or two studs protruding outside of handle adapter 55, through a slot on the side or both sides of handle adapter 55, to engage trigger fork 58. Trigger fork 58, which is mounted around or externally of handle adapter 55, has an upper trigger pivot 61 that is mounted through handle adapter 55. Trigger fork 58 pulls valve stem anchor 37 in an upstream direction, shown in FIG. 4 as left to right, when trigger fork 58 is pulled by hand toward handle 50, resulting in opening of the discharge port of valve seat 44. When trigger fork 58 is released, valve stem anchor 37 moves downstream, shown in FIG. 4 as to the left, to close the discharge port of valve seat 44, by the action of spring 57, as shown in FIG. 4. The spring force required to close valve assembly 20 is a function of the working fluid pressure and the diameter of valve stem 35. One disadvantage of this embodiment is that the hand force required to overcome the force exerted by the fluid pressure can be relatively high and thus cause fatigue to the human operator. Since such mounting of trigger fork 58 requires a slot on the side or both sides of handle adapter 55, another disadvantage of this embodiment is that the side slots allow debris to enter into the cylindrical cavity of handle adapter 55 and to cause wear on valve stem 35 and stem seal 43.

Also in such embodiment of this invention, one or more trigger springs 59 can be positioned near the end of valve trigger 60 for returning handle 50 to a normally-closed position of valve assembly 20. Trigger spring 5 is advantageous since a relatively weak spring can provide a strong force to valve stem anchor 37 due to the moment arm or lever action of valve trigger 60 and trigger fork 58, while not resisting human hand action in opening valve assembly 20. One advantage to such embodiment is that the diameter of valve stem 35 can be reduced and still accommodate relatively high working fluid pressures. For example, valve stem 35 having 0.078 inches in diameter has a cross-sectional area of 0.0048 square inches. Such relatively slim valve stem 35 can have a tensile strength of greater than 500 $lb_f$ if valve stem 35 is made of a relatively high-strength stainless steel. When a fluid having approximately 30,000 psi is introduced into cavity 34 of such valve assembly 20, a force of about 144 $lb_f$ will be exerted on valve stem 35 to force it in an upstream direction, or toward the right as shown in FIG. 4. If the discharge port of valve seat 44 is in contact with valve poppet 40 which has a sphere with a diameter of 0.094 inches, the hold down force of the poppet, induced by the fluid pressure, will be about 208 $lb_f$. Thus, a net force of 64 $lb_f$ (208 $lb_f$ — 144 $lb_f$) will be required to pull valve stem 35 in an upstream direction, from left to right as shown in FIG. 4, to open valve assembly 20 if the action of spring 57 is disregarded. If valve trigger 60 is approximately 6 inches long, a hand pulling force of about 15 $lb_f$ will open valve assembly 20. Once the valve discharge port is open, the hold down force for valve poppet 40 is overcome and the hand force required to keep the valve open is significantly reduced. In fact, the only hand force required to keep the valve open is a force which counters forces from spring 57. Spring 57 is necessary for closing the valve assembly. The compression springs must provide a combined force sufficiently greater than the 144 $lb_f$ exerted on valve stem 35 by the fluid at 30,000 psi, when handle 50 is released to a normally-closed position. Such force can be readily supplied by the combination of springs, particularly trigger spring 59 positioned at the end of valve trigger 60, due to the moment arm or lever action.

A compression adjustment at the end of handle 5 can be used to fine tune the spring force to meet the requirements at various fluid pressures. As shown in FIG. 4, such fine tuning is accomplished with spring disk 24 mounted adjacent an upstream end of spring 57, and adjusting bolt 49 threadedly engaged within handle 50 so as to engage with spring disk 24 and either compress or release spring 57 depending upon the rotational direction of adjusting bolt 49. The spring force is not transmitted to valve poppet 40 so that a slender valve stem 35 is not in direct contact with valve poppet 40 to produce high bending stresses. Also, the guide provided by seal support 41 and valve stem anchor 37 is used to dissipate the side load on valve stem 35, which is induced by the pressurized fluid. This also reduces the chance of valve stem 35 breaking. According to the embodiment as shown in FIG. 4, a relatively lightweight valve assembly 20 can be constructed which requires only human hand force to overcome the fluid pressure exerted on valve stem 35. However, with relatively high working pressures and large flow rates, such embodiment is not practical since human hand fatigue increases over a relatively short period of time due to need for using larger valve stems and stronger springs.

Figure 5:
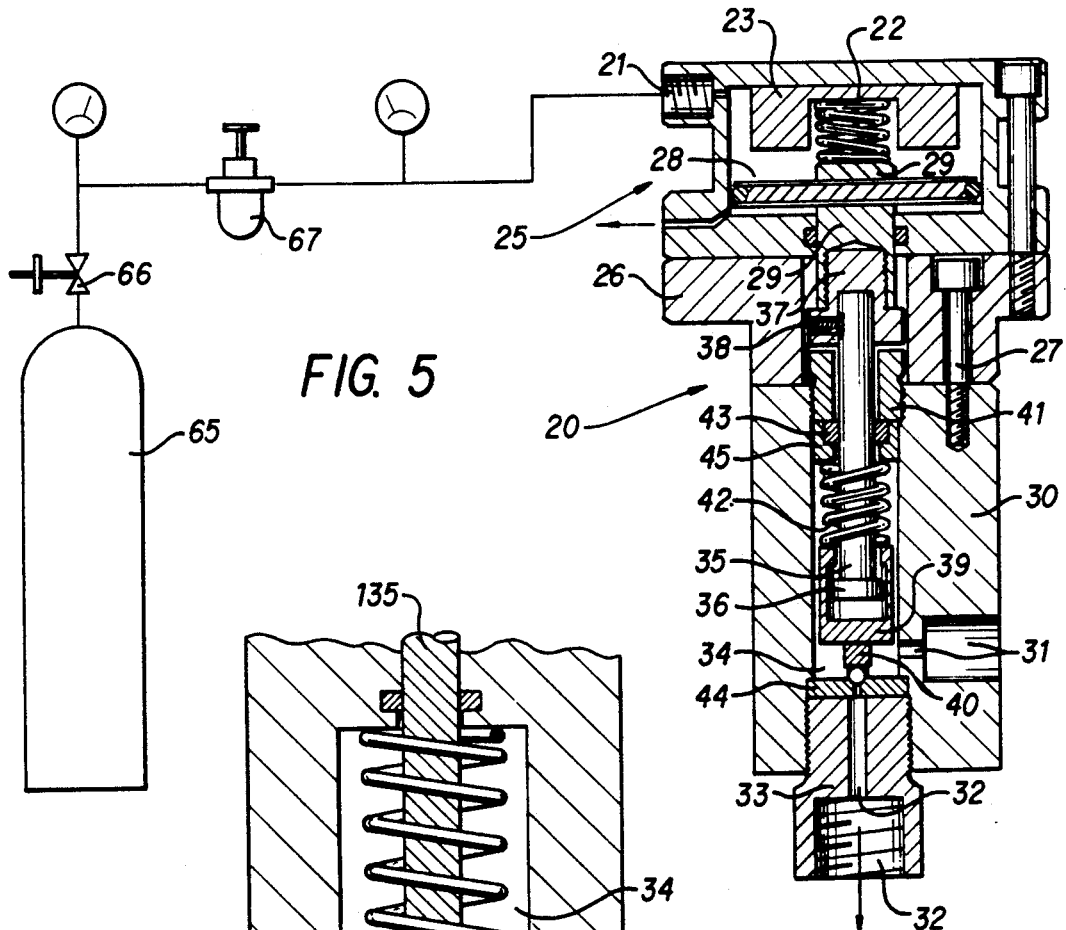
FIG. 5 is a partial cross-sectional view of a pneumatically operated fluid pressure regulator for maintaining a desired operating pressure within a high pressure fluid system, with the compressed air supply system shown in schematic diagram form, according to another embodiment of this invention.

FIG. 5 shows another embodiment according to this invention which incorporates pneumatic actuator 25 which is particularly suitable for use with incompressible working fluids, such as water at very high pressures. Valve assembly 20, as shown in FIG. 5, comprises valve stem 35, stem spring 42, stem collar 39 and valve poppet 40 in a similar fashion to that as shown in FIG. 1, to provide improved fluid pressure regulating capabilities. The arrangement of seal support 41, seal cage 45 and stem seal 43 is also similar to the embodiment as shown in FIG. 1. Valve stem 35 is connected to pneumatic actuator 25. FIG. 5 also shows a schematic diagram of the compressed air supply. As shown in FIG. 5, the compressed air supplied comprises compressed air tank 65 with shut-off valve 66 and pressure regulator 67. It is apparent that compressed air tank 65 can be replaced with an air compressor or another suitable source of compressed air or compressed gas, such as nitrogen or carbon dioxide. It is also apparent that pneumatic actuator 25 can be replaced with a hydraulic actuator system for use with pressure regulator 67, depending upon the particular application and thus the required actuating forces.

As shown in FIG. 5, valve stem 35 is indirectly connected to piston 28 which is driven by a source of compressed air at a predetermined pressure which is in relationship to the working fluid pressure. In another preferred embodiment according to this invention, pneumatic actuator 25 can also operate as a constant pressure actuator with sufficient volume to contain a pressure at a desired level. Compressed air inside the upper chamber defined by pneumatic actuator 25 exerts a force on piston 28 and thus valve stem 35. Such force is in balance with a force induced by the working fluid which is exerted on valve stem 35 within valve cavity 34. When valve assembly 20 is in a closed position, valve poppet 40 is seated within the discharge port of valve seat 44 and thus valve stem 35 is in an at rest condition. If the fluid pressure within cavity 34 is increased, the force on valve stem 35, which is induced by the working fluid pressure is also increased and valve stem 35 will rise, engage stem collar 39, lift valve poppet 40 and open the discharge port of valve seat 44 to allow fluid to flow and will thus cause a pressure drop within the working fluid. Once pneumatic actuator 25 senses a reduced pressure within cavity 34, piston 28 of pneumatic actuator 25 immediately pushes valve stem 35 in a downstream direction, shown as downward in FIG. 5, and valve poppet 40 will again close the discharge port of valve seat 44. Such action is repeated according to the pressure fluctuation of the working fluid within cavity 34. Thus, a fluid pressure regulator functions much the same as valve assembly 20 only with pressure sensing capabilities, according to this invention.

With compressible fluids such as gases, pressure is easier to regulate since the amount of fluid discharged from the regulator can be precisely controlled by partially or fully opening the outlet port of the pressure regulator. With incompressible fluids such as water at high pressures, the pressure regulating task becomes more difficult for several reasons. With incompressible fluids, or fluids that are slightly compressible at extreme pressures, the flow rate of fluids, such as water, through an orifice is basically determined by the cross-sectional area of the orifice and the pressure differential across the orifice. As a result, it is difficult to partially open an outlet port to discharge a controlled amount of water at a very high pressure. Such high pressure discharge must be performed with the discharge port either fully opened or fully closed. Otherwise, the high pressure fluid rapidly erodes valve poppet 40 and valve seat 44. Due to such operating principles, the fluid pressure within a conventional regulator is often in the form of a step function of high amplitude and thus the pressure is too low when the outlet port is opened and the pressure is too high when the outlet port is closed. The valve poppet is thus subject to constant pounding against the valve seat from forces transmitted from the pneumatic actuator through the valve stem. According to this invention, the constant pounding forces are either reduced or eliminated by a "soft landing" feature of valve poppet 40 as forces from pneumatic actuator 25 are isolated from valve poppet 40 by stem collar 39. The pressure of the working fluid is used to seat valve poppet 40 against valve seat 44. As a result, valve poppet 40 according to this invention has a considerably longer life than a valve poppet of a conventional pressure regulator. The ball poppet of this invention, as shown in FIGS. 1 and 2, is particularly suitable for use in a pressure regulator since relatively hard carbide and ceramic spheres having very smooth and precise surfaces are conventionally available and can be used according to this invention to provide longer service life. The pressure regulation sensitivity according to this invention is enhanced when the diameter of valve stem 35 is comparatively large to the diameter of the discharge port of valve seat 44, since a relatively small change in working fluid pressure will generate significant changes in the force acting against valve stem 35. According to this invention, a relatively slender or slim valve stem 35 is advantageous whereas with conventional on-off valves, such small valve stems are disadvantageous.

Since it is more difficult to control the flow of an incompressible fluid at an extremely high pressure, as compared to a compressible fluid, if the pressure regulator has only one fluid outlet of a given diameter, such fluid outlet cannot effectively regulate the fluid pressure. The fluid pressure inside cavity 34 drops to its lowest level quickly when fluid outlet 32 is open. In most cases, such pressure level is too low if the discharge port within valve seat 44 is relatively large. On the other hand, if the discharge port of valve seat 44 is not large enough, the reduction in fluid pressure, as the discharge port opens, may not be large enough. Thus, such situation can be improved if there are multiple discharge ports of different sizes within valve seat 44, particularly if such discharge ports are operated in an orderly fashion according to the fluid pressure conditions of the system. Valve assembly 20 according to this invention provides such capabilities.

Figure 6:
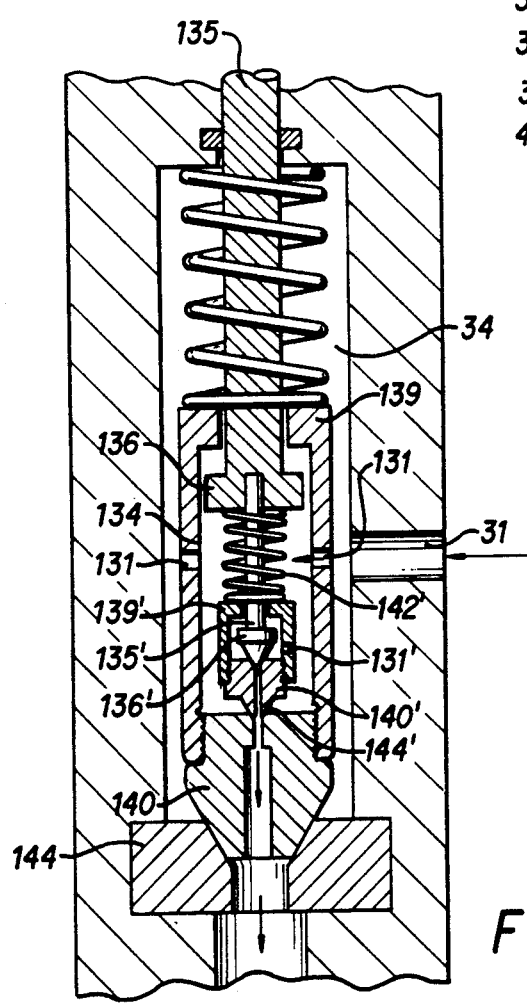
FIG. 6 is a partial cross-sectional view of an internal valving arrangement of a fluid pressure regulator, showing use of multiple poppets and fluid outlets within a single valve stem, for greater pressure regulating sensitivity, according to still another embodiment of this invention.

Referring to FIG. 6, a basic valve assembly 20 according to this invention is shown with elements arranged in an axial position to provide greater sensitivity in fluid pressure regulation when arranged to function as a pressure regulator. In such embodiment according to this invention, primary valve stem 135 is indirectly connected to pneumatic actuator 25, either as previously discussed or in another suitable manner. Primary valve stem 135 has a downstream end with primary stem shoulder 136 which engages an upstream end of primary stem collar 139. The downstream end of primary stem collar 139 is threaded to primary valve poppet 140. Within cylindrical primary cavity 134 of primary stem collar 139, another secondary valve stem 139', secondary stem spring 142', secondary stem collar 139' and secondary valve poppet 140' can be used to open and close a secondary fluid discharge port within secondary valve seat 144'. Multiple and further valve stem, stem spring, stem collar and valve poppet assemblies can be used to form multiple steps of discharging the working fluid. As shown in FIG. 6, primary stem collar 139 defines primary fluid inlet 131. Thus, as shown in FIG. 6, three fluid outlets which vary in size from smallest downstream to the largest, are used within the fluid pressure regulator. In one preferred embodiment, secondary valve stem 135' can be an integral part of primary valve stem 135. Secondary valve stem 135' also has secondary stem shoulder 136' which engages an upstream portion of secondary stem collar 139' with secondary stem spring 142' positioned along the length of secondary valve stem 135'. As shown in FIG. 6, secondary stem shoulder 136' can have a conical portion for mating with the tertiary discharge port of secondary valve poppet 140'. A threaded downstream end of secondary stem collar 139' engages with secondary valve poppet 140', which contacts primary valve poppet 140 and thus controls the tertiary discharge port within secondary valve poppet 140'. Primary valve poppet 140 contacts with primary valve seat 144 for controlling the opening and closing of the primary discharge port of primary valve seat 144.

Still referring to FIG. 6, the vertical movement of primary valve stem 135 engages two stem collars 139 and 139', and causes three separate valve poppets to rise or fall and thus open or close three individual fluid outlets of different sizes, with the upstream fluid outlet having the smallest diameter. When the working fluid pressure is balanced with the air pressure inside pneumatic actuator 25, the pressure regulator is at rest and all fluid outlets are closed by the respective valve poppets. As the fluid pressure is increased, primary valve stem 135 rises and causes the discharge port within secondary valve seat 144' to open and thus allow discharge of a certain amount of fluid at a flow rate which can be calculated by the size of the secondary discharge port within secondary valve seat 144', as well as the fluid pressure. As a result, the working fluid pressure will drop and primary valve stem 135 will move downstream to close the secondary discharge port within secondary valve seat 144'. However, if the system pressure increase is relatively high and such pressure and flow exceeds that which the discharge port of secondary valve seat 144' can handle, primary valve stem 135 will not drop downstream but will continue to move upstream such that secondary stem shoulder 136' engages to lift secondary stem collar 139', and thus open the primary discharge port of primary valve poppet 140. Such secondary discharge port can be sized to provide desired fluid pressure reduction with respect to that provided by the tertiary discharge port within secondary valve poppet 140'. As a result, the working fluid pressure can be further reduced. If the total pressure reduction is sufficient to restore the system pressure back to the level set at pneumatic actuator 25, then the secondary discharge port of primary valve poppet 140 can close alone or together with the tertiary discharge port of secondary valve poppet 140'. On the other hand, if the secondary discharge port of primary valve poppet 140 and the tertiary discharge port of secondary valve poppet 140' is not sufficient to reduce the system pressure to the set level, valve stem 135 will continue to rise upstream and eventually cause the primary discharge port of valve seat 144 to open. Such primary discharge port is generally considerably larger than the upstream discharge ports and the primary discharge port functions as a failsafe outlet to prevent over-pressurization of the system, if for example a safety relief valve or rupture disk is either not provided within the system or fails to operate. The primary discharge port of valve seat 144 can also be sized to provide continuous pressure reduction so that the overall range of pressure regulation provided by the combination of the three fluid discharge ports is smooth and continuous. The freedom of sizing the three discharge ports, as shown in FIG. 6, will guarantee satisfactory pressure reduction in any fluid system.

Although conically shaped valve poppets are shown in FIG. 6, valve poppets of other shapes can be used as previously described, such as those shown in FIGS. 3 and 3A. It is apparent that the first discharge port to open is the one that is operated most frequently and thus a ball poppet is most desireable. On the other hand, a disk poppet can be used if the system pressure is very high. It is important to note that the "soft landing" feature provided at primary valve poppet 140 and secondary valve poppet 140' can also be provided in the tertiary valve stem assembly. Also, the tertiary valve stem assembly can be completely eliminated.

Also, as shown in FIG. 6, the high pressure on-off valve has sequential valve opening capabilities to handle incompressible fluids at relatively high flow rates. It is apparent that incompressible fluids, such as oil and water, can generate serious hammering effects when they are discharged by a valve at a relatively high pressure, or suddenly closed. The so-called "water hammer" effect is the result of operating a valve at significantly high pressures. At very high pressures, the shock generated by the fluid flow can be quite damaging to other system components. As a result, a sequential opening of multiple valves can be applied to handle large flows at relatively high pressures. It is well known in hydraulics that multiple valves can be used to accomplish such results, but application of such hydraulics to high pressure water jetting apparatuses is considered as novel due to the relatively low flow rate. However, more large flow water system operations are functioning today, as compared to the past, at pressures above 10,000 psi. Such high pressures create an acute demand for improved on-off valves capable of handling large flow rates. This invention allows a single valve to be constructed with sequential opening capabilities for handling incompressible fluids at extremely high pressures and high flow rates.

Also as shown in FIG. 6, the sequential valve arrangement according to one embodiment of this invention will have a valve stem assembly similar to the pressure regulator with multiple outlets, according to this invention. The upstream end of valve stem 35 is connected to a hydraulic or pneumatic actuator 25 that transmits a push, pull or push/pull linear action to valve stem 35, depending on the design of pneumatic actuator 25 and the desired valve operation. To open valve assembly 20, a lifting force is applied to valve stem 35 by pneumatic actuator 25. The rise of valve stem 35 will first open the tertiary discharge ports of secondary valve poppet 140', as shown in FIG. 6, discharge a certain amount of fluid into a downstream section and thus reduce the fluid pressure inside cavity 34 by a defined amount. Subsequently, the secondary discharge port of primary valve poppet 140 will open and discharge an additional amount of fluid into a downstream portion of the valve, thus further reducing the pressure differential across the valve. Finally, the primary discharge port within valve seat 144 will open and the fluid pressure across the valve will be reduced and balanced within a relatively short time period. Such sequential opening of multiple fluid discharge ports lessens the shock generated by sudden surges of high pressure fluids.

In reversed operation of valve assembly 20 as shown in FIG. 6, the multiple discharge ports are closed in sequential order. For example, the primary discharge port is closed first, followed by the secondary and tertiary discharge ports. Thus, a sudden stop of high pressure fluid in a piping system is avoided and any hammer effect will be eliminated. The sequential operation of the three discharge ports is beneficial to both the valve opening and valve closing operations, allowing smooth transition in pressure equalization or pressure stoppage that single-port valves cannot provide. According to this invention, the three discharge ports can be sized to achieve different results according to the conditions both upstream and downstream of the on-off valve. The valve poppets according to this invention can be shaped into various forms and the fluid discharge ports can be inserted with special orifices to improve durability and to provide more accurate control of the flow rate. The timing of the valve operation can also be varied by controlling the speed of pneumatic actuator 25 and the distance between each valve stem shoulder or length of the components.

This invention allows construction of a rather complicated valve in a compact valve body. Furthermore, according to this invention, the valve stem assembly also appears to be complicated but is actually relatively simple and the various components of the valve stem assembly experience relatively low stresses and thus longer life, and improved reliability can be expected. Also according to this invention, a relatively small valve, with respect to the size of conventional valves capable of operating under similar conditions, can handle incompressible fluids at relatively high flow rates and relatively high pressures, with reduced fluid shock both upstream and downstream of the valve. The valve according to this invention also reduces the stresses within the actuator as the forces from the valve stem are extended over a longer period of time.

Figure 7:
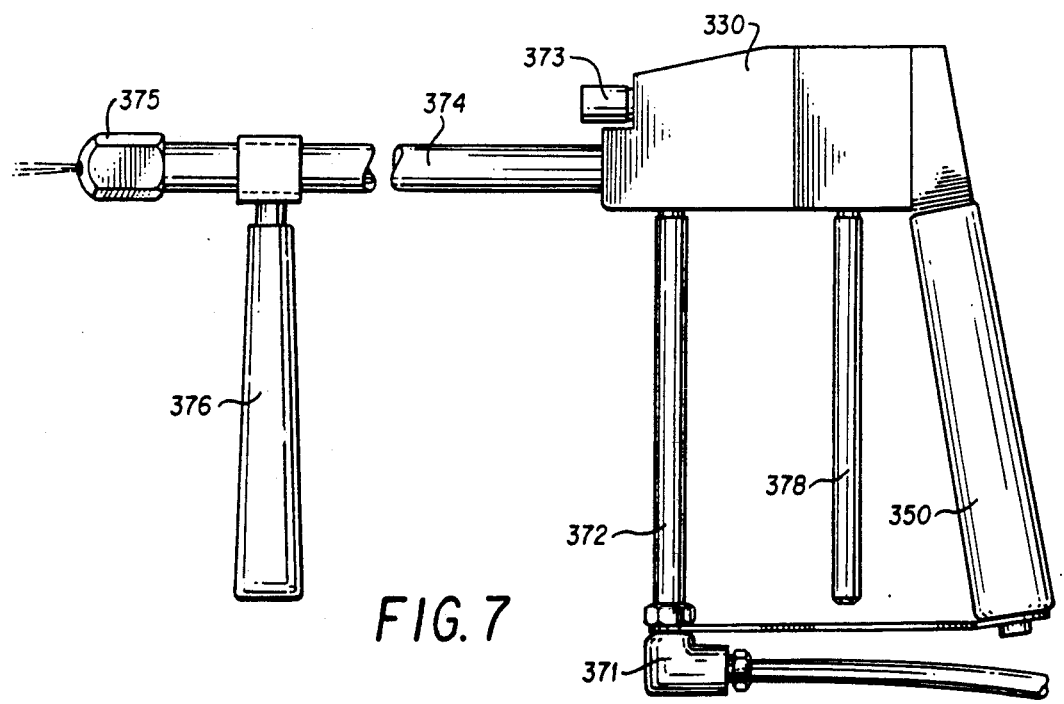
FIG. 7 is a front view of a hand-operated waterjet lance, according to another preferred embodiment of this invention.

FIG. 7 shows another preferred embodiment according to this invention, which is a front view of a hand-operated waterjet lance having a closure valve for controlling fluid flow to a discharge nozzle assembly at extremely high fluid pressures. Such lance is particularly suitable for water jetting operations at water pressures in excess of 10,000 psi. In operation, pressurized water from a pump discharge flows through a tube or hose to the lance at inlet adapter 371 of the lance, as shown in FIG. 7. The pressurized water then flows into valve body 330 through inlet tube 372. Valve body 330 comprises a hand-actuated valving mechanism which controls the discharge of pressurized water into outlet tube 374, which terminates at waterjet nozzle assembly 375. A high velocity waterjet is generated and aimed at a target or a piece of work. A forward handle 376 is secured with respect to outlet tube 374. At a rear or upstream portion of valve body 330, rear handle 377 is used to pull valve trigger 378 to open the closure valve.

Figure 8:
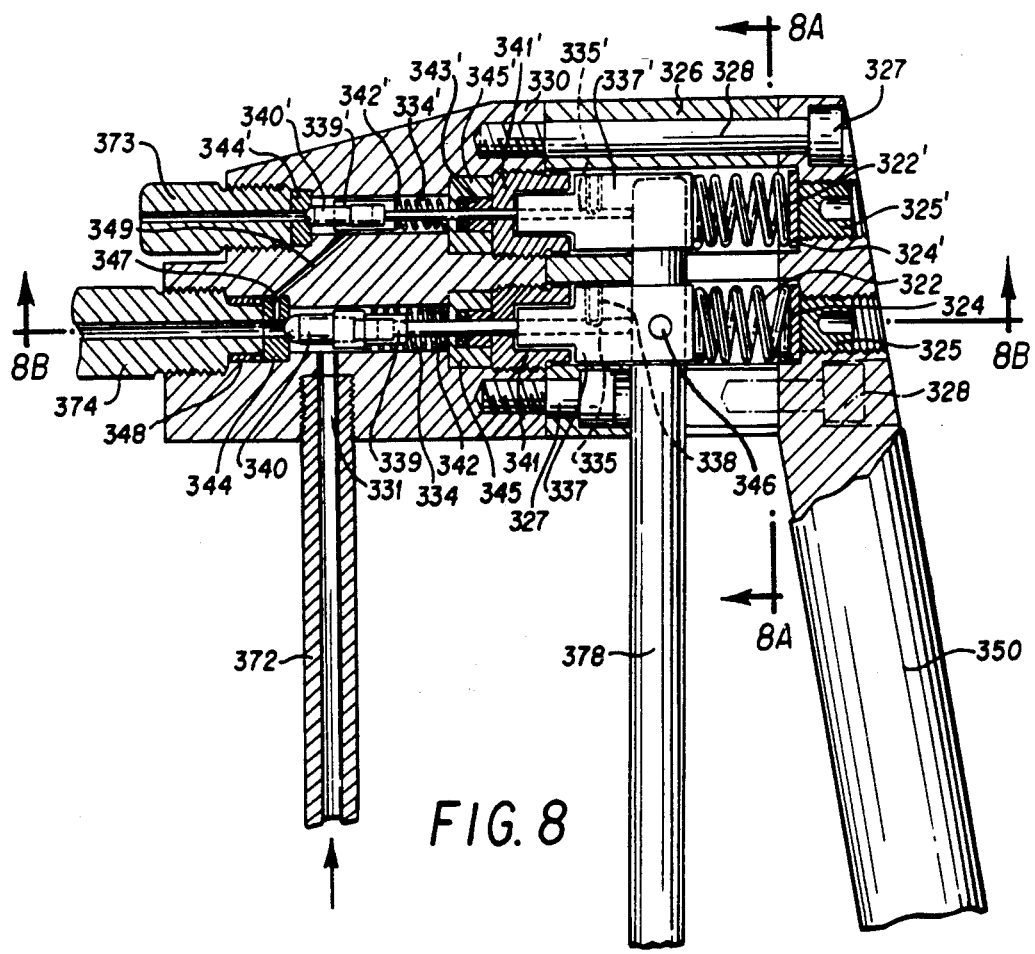
FIG. 8 is a partial cross-sectional view of the hand-operated waterjet lance, as shown in FIG. 7.
Figure 8A:
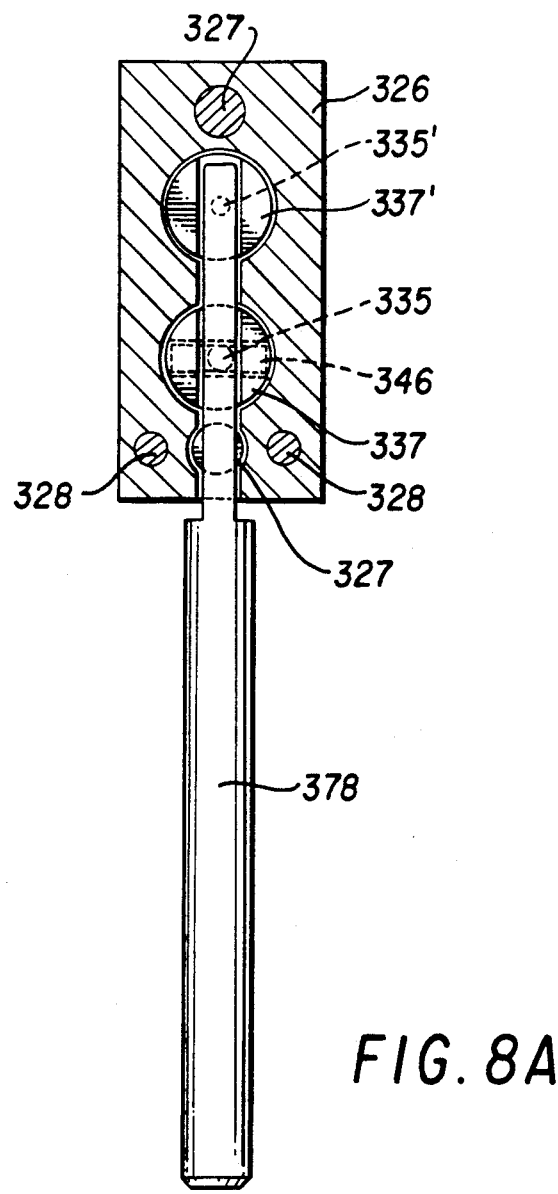
FIG. 8A is a partial cross-sectional view taken along line 8A—8A, as shown in FIG. 8.
Figure 8B:
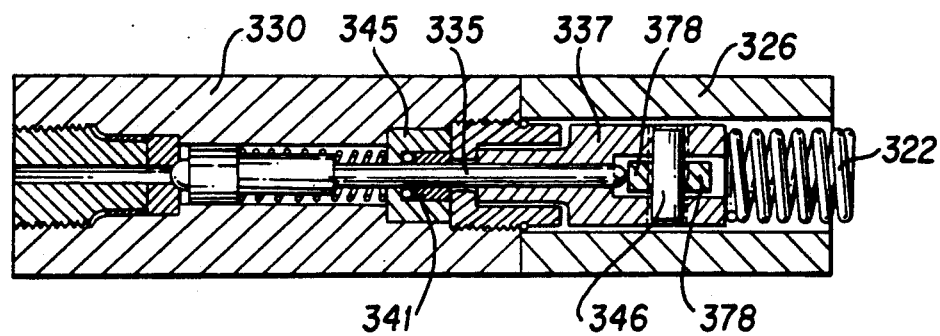
FIG. 8B is a partial cross-sectional view taken along line 8B—8B, as shown in FIG. 8.

FIG. 8 shows a partial cross-sectional view of the hand-operated closure valve as shown in FIG. 7. FIGS. 8A and 8B each show a partial cross-sectional view along lines 8A—8A and 8B—8B, respectively, as shown in FIG. 8. The assembly shown in FIG. 8 comprises three main sections: valve body 330, middle adapter block 326 and handle 350. Valve body 330 has two parallel cylindrical cavities 334', 334. The upper cavity acts as a dump valve cavity 334' and the lower cavity acts as a main valve cavity 334. Main valve cavity 334 has fluid inlet 331 which is in communication with inlet tube 372 and main valve cavity 334. A downstream end of main valve cavity 334 terminates at main valve seat 344. An upstream end of main valve cavity 334 terminates at main seal cage 345 which is secured within a shoulder of valve body 330. As previously discussed with respect to the embodiment of this invention shown in FIG. 1, main stem seal 343 is tightly and sealably mounted within main seal cage 345 and main seal cage 345 is mounted within valve body 330 with a tolerance fit which is preferably loose enough so that when valve body 330 is separated from middle adapter block 326, main seal cage 345 falls out of valve body 330 by or due to gravitational forces.

Main valve cavity 334 houses a main valve stem assembly, which is similar to that as described with respect to FIG. 1, comprising main valve poppet 340, main stem collar 339, main stem spring 342 and main valve stem 335. Main valve stem 335 extends through main seal cage 345, main stem seal 343, the main valve stem assembly and main seal support 341. Main valve stem 335 is mounted within a central through hole of cylindrical main valve stem anchor 337. The main valve stem assembly is free to slide along a linear direction, parallel to a longitudinal axis of main valve stem 335, within main valve cavity 334. Main stem spring 342 constantly exerts a relatively small force against main stem collar 339 to keep main valve poppet 340 in a position to engage with main valve seat 344. As clearly shown in FIGS. 8A and 8B, main valve stem anchor 337 has a slot at an upstream portion to internally accommodate valve trigger 378. Main valve stem anchor 337 is in contact with a downstream end of main spring 322 and an upstream end of main spring 322 is in contact with a main spring disk 324. Main spring disk 324 is in contact with main adjusting bolt 325 which is used to adjust the compression of main spring 322, and thus vary the force exerted on main valve stem 335 from main spring 322. It is apparent that engaging trigger 378 against handle 350 allows trigger 378 to pivot within the slots of main valve stem anchor 337 and middle adapter block 326, which compresses main spring 322 and thus pulls main valve stem 335 in an upstream direction, shown as from left to right in FIG. 8. With such motion, main valve poppet 340 is pulled away from main valve seat 344. Main valve stem 335 is secured to main valve stem anchor 337 with main set screw 338. As shown in FIGS. 8A and 8B, trigger 378 passes through and is pivotally mounted, within a slot that passes through main valve stem anchor 337, with pivot pin 346. As shown in the drawings, the slots within main valve stem anchor 337, dump valve stem anchor 337' and middle adapter block 326 have enough tolerance to allow trigger 378 to pivot, with respect to pivot pin 346, within the slots. The trigger according to other embodiments of this invention is positioned within the respective slots in a similar fashion.

As shown in FIG. 8, main valve seat 344 has a central discharge port and side bleed hole 347. Main valve seat 344 is mounted within valve body 330. In one preferred embodiment according to this invention, a threaded end of outlet tube 374 engages with an internally threaded cavity of valve body 330. Seal assembly 348 is secured between outlet tube 374 and main valve seat 344, in order to prevent leakage around outlet tube 374. Main valve seat 344 is positioned against a shoulder of valve body 330, at a downstream end of main valve cavity 344 in a fluid-tight manner such that pressurized fluid is held within main valve cavity 334, particularly when the fluid discharge port of main valve seat 344 is closed by main valve poppet 340. The main discharge port of main valve seat 344 is in communication with bleed hole 347. When assembled, bleed hole 347 is in communication with crossover bleed channel 349. Crossover bleed channel 349 is in communication with dump valve cavity 334'. Thus, pressurized fluid enters dump valve cavity 334' only when the main discharge port of main valve seat 344 is open and pressurized fluid is flowing through such main discharge port. Dump valve cavity 334' is similarly arranged to main valve cavity 334. Dump valve seat 344' is mounted at a downstream end of dump valve cavity 334'. Dump seal cage 345' is mounted at the upstream end of dump valve cavity 334'. In a similar fashion to the arrangements previously described, dump stem seal 343' is mounted within dump seal cage 345'. Thus, dump valve cavity 344' is fluid-tight and houses the dump valve stem assembly. In a preferred embodiment according to this invention, the dump valve assembly has different dimensions from those of the main valve stem assembly.

The dump valve stem assembly comprises dump valve poppet 340', dump stem collar 339', dump stem spring 342' and dump valve stem 335'. Dump stem seal 343', dump seal cage 345', dump seal support 341' and dump valve stem anchor 337' also have similar characteristics to those of the main valve stem assembly. Dump valve stem anchor 337' has a cylindrical protrusion at a downstream end to engage dump valve stem 335' and dump seal support 341', and a slot at an upstream end to accommodate trigger 378, as shown in FIG. 8A, and to make contact with dump spring 322'. Dump spring 322' has a downstream end adjacent an upstream portion of dump valve stem anchor 337'. An upstream end of dump spring 322' is adjacent dump spring disk 324'. Dump adjusting bolt 325' is mounted within handle 350 and is used to adjust dump spring 322' by moving dump spring disk 324' in a direction which is parallel to dump valve stem 335'. Dump valve seat 344' has a dump discharge port which is opened and closed by dump valve poppet 340'. Dump outlet tube 373 has external threads which engage with internal threads of a cavity within valve body 330, which is positioned adjacent the downstream end of dump valve cavity 334'. Thus, dump valve seat 344' is secured with respect to valve body 330.

Tie bolts 327, preferably an upper and lower tie bolt 327, and two smaller handle bolts 328 are used to secure together the three main components of the valve assembly: valve body 330, adapter block 326 and handle 350. Trigger 378 is mounted within adapter block 326 with main valve stem anchor 337 and pivot pin 346. Adapter block 326, main valve stem anchor 337 and dump valve stem anchor 337' each comprise a slot which accommodates trigger 378, as shown in FIG. 8.

As shown in FIG. 8, in an at rest position without pressurized fluid inside valve body 330, or at very low fluid pressures within valve body 330, main valve stem 335 and dump valve stem 335' are both forced by main spring 322 and dump spring 322', respectively, into main valve seat 344 and dump valve seat 344', respectively, thus closing both the main and dump discharge ports. In such condition of the valve, trigger 378 is in a neutral, vertical position, as shown in FIG. 8. When pressurized fluid enters main valve cavity 334, at designed working pressures, the main discharge port remains closed even with fluid forces pushing against main valve stem 335. Inadvertent opening of the main discharge port is prevented by sizing the main discharge port with respect to the diameter of main valve stem 335 as well as the forces from main stem spring 342. The main discharge port of main valve seat 344 can be opened by merely providing additional force against main stem spring 342 through trigger 378 by pulling trigger 378 toward handle 350. The lever action from trigger 378 amplifies the force applied by a human hand on trigger 378 and delivers such force to main valve stem 335 through pivot pin 346. However, due to the particular design of such valve arrangement according to this invention, trigger 378 will first exert force against dump valve stem anchor 337', thus making certain that the dump discharge port of dump valve seat 344' is properly closed. Continued motion of trigger 378 toward handle 350 will open the main discharge port of main valve seat 344 and thus send the pressurized fluid through main outlet tube 374 to nozzle assembly 375.

When the valve assembly is in an open position, pressurized fluid enters dump valve cavity 334' through crossover bleed channel 349 and exerts forces from the pressurized fluid against dump valve stem 335'. Dump valve stem 335' is properly sized for the maximum working fluid pressure of the valve assembly such that the fluid forces are less than the forces from the human hand through trigger 378 in combination with the forces from dump spring 322', to ensure positive closure of the dump discharge port during the lancing operations. By virtue of the valve stem assembly according to this particular embodiment of this invention, the human hand forces in addition to the forces from dump spring 322' are not transmitted to dump valve poppet 340, thus avoiding excessive bending stresses on dump valve stem 335'. In fact, the diameter of the dump discharge port of dump valve seat 344' is constructed slightly smaller than the diameter of dump valve stem 335', such that the pressurized fluid within dump valve cavity 334' exerts a continuous greater force against dump valve stem 335' than against dump valve poppet 340'. Thus, the dump discharge port will be opened when the human hand force on trigger 378 is released. Furthermore, the fluid force exerted on dump valve stem 335' is also designed to be greater than the force from dump stem spring 342'. According to this particular embodiment of this invention, opening of the dump discharge port upon releasing trigger 78 with respect to handle 350 is a very important aspect.

Also as shown in FIG. 8, upon releasing trigger 378 with respect to handle 350, the dump discharge port of dump valve seat 344' is opened and pressurized water is thus released to the atmosphere through dump outlet tube 373. As a result, the fluid pressure within the entire valve assembly is drastically reduced due to the fact that the water acts as an incompressible fluid. In such condition, main stem spring 342 forces main valve stem 335 toward main valve seat 344 and thus main valve poppet 340 seats and closes the main discharge port of main valve seat 344. Such action completes the cycle of opening and closing the main valve by pulling trigger 378 toward handle 350 and subsequently releasing trigger 378 with respect to handle 350. The momentary release of fluid pressure within main valve cavity 334 allows the use of a relatively large fluid discharge port and a stout main valve stem 335, without necessarily using a relatively large and powerful main stem spring 322. Thus, a high flow capacity through the valve assembly can be achieved at high fluid pressure with a minimum pressure drop. Since dump valve cavity 334' is in communication with main valve cavity 334 through crossover bleed channel 349, at the point downstream from main valve seat 344, the dump discharge port of dump valve seat 344' will always remain closed when pressurized water is shut off by the main valve. According to this invention, particularly with the embodiment shown in FIG. 8, a reliable and practical hand-operated valve can be constructed to handle water at pressures in excess of 30,000 psi.

Figure 9:
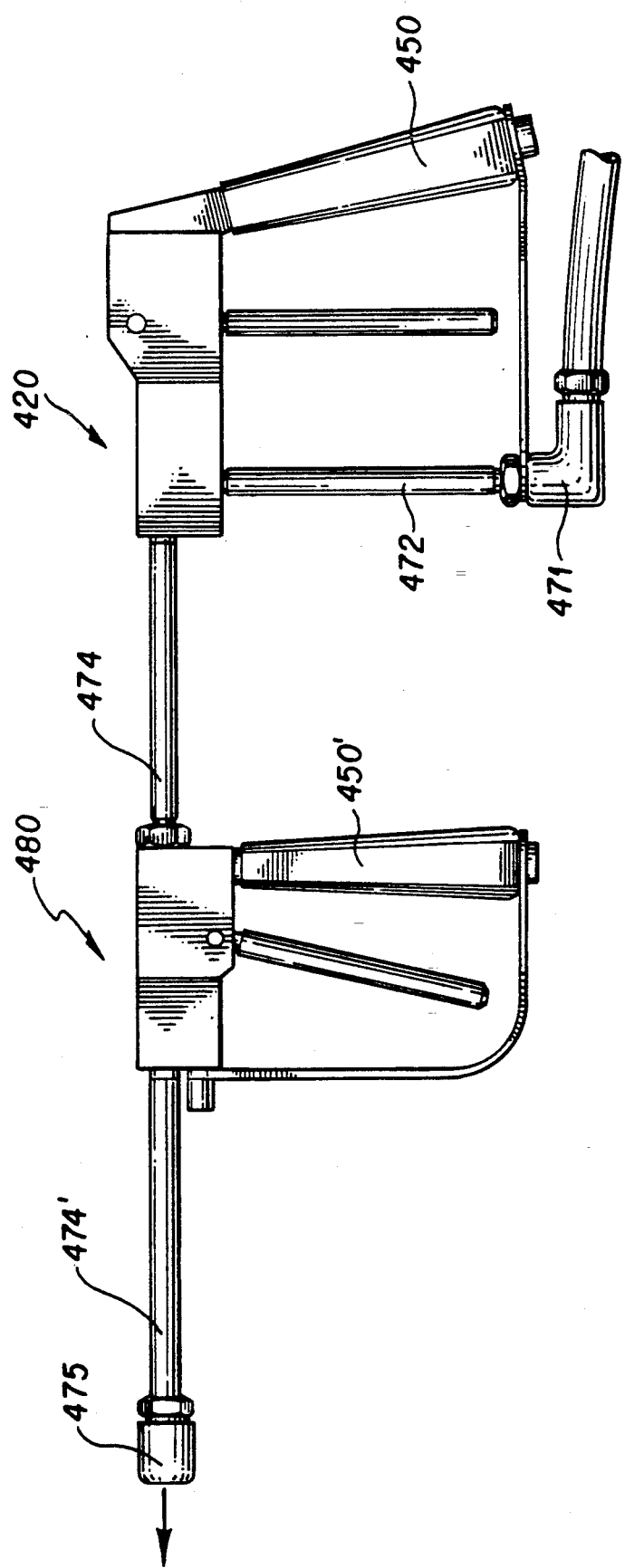
FIG. 9 is a front view of a dual hand-operated waterjet lance according to yet another preferred embodiment of this invention.

According to another preferred embodiment of this invention as shown in FIG. 9, the dump valve assembly is moved to the front of the water jet lance and is a completely separate unit from the main valve body, except for a water conduit connection. In this particular embodiment of this invention, the momentary dump of pressurized water inside the water jet lance system is operated by a forward human hand while the rearward human hand operates the main closure valve. As shown in FIG. 9, pressurized fluid from a pump discharge flows to the water jet lance through a tube, hose or other conduit, and enters the closure valve through inlet adapter 471 and inlet tube 472. After passing through the main valve discharge port of rear closure valve 420, the pressurized water flows through outlet tube 474 and into front momentary dump valve 480, and then discharges through nozzle assembly 475 by way of secondary outlet tube 474'. In comparison with the embodiment of this invention as shown in FIG. 8, the momentary dumping operation according to the embodiment shown in FIG. 9 occurs within front momentary dump valve 480 which is a separate valve operated by a front positioned human hand. As a result, this particular embodiment allows simultaneous use of both human hands to operate the water jet lance, which improves the safety operation of the apparatus.

Figure 10:
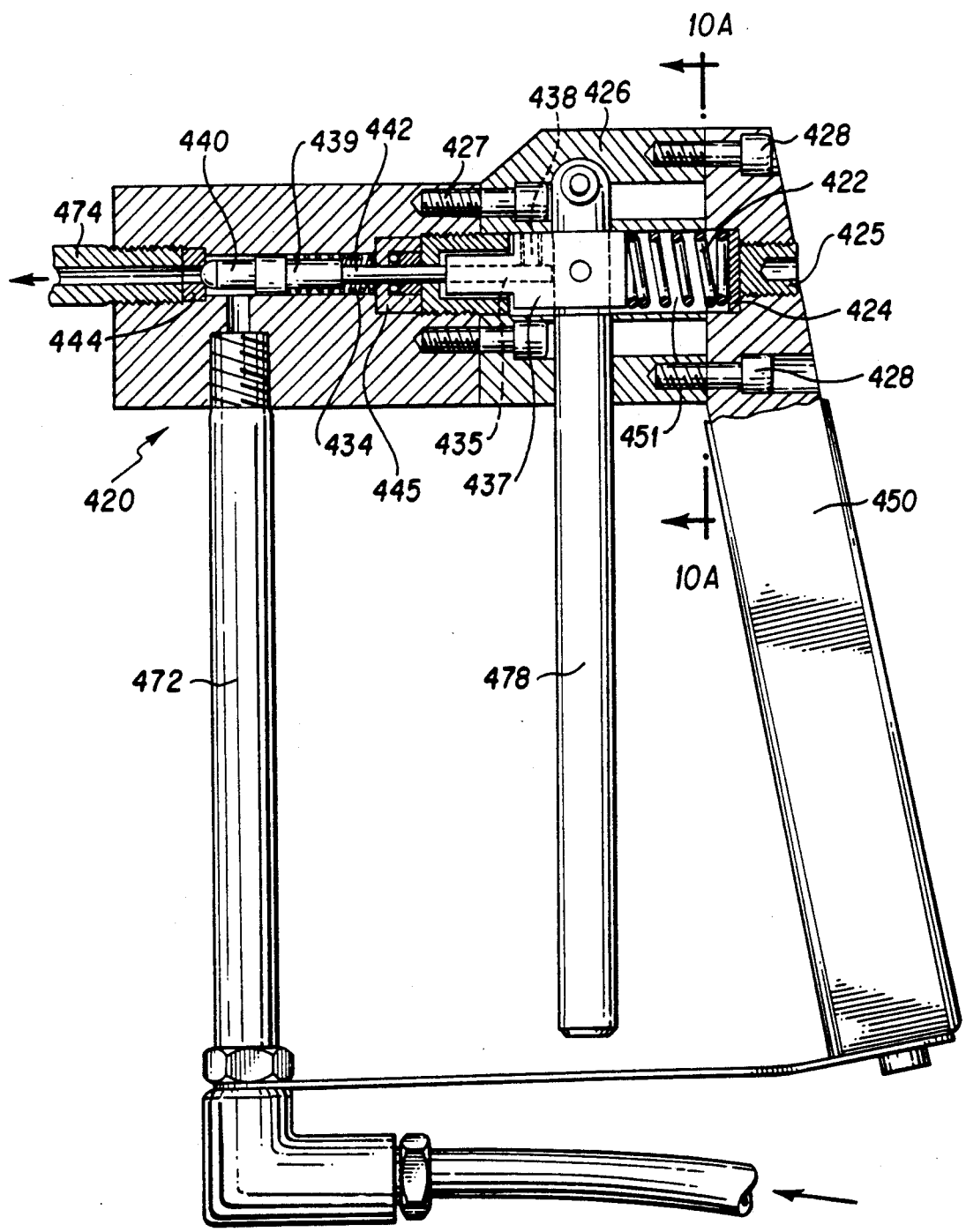
FIG. 10 is a partial cross-sectional view of a rear closure valve of the dual hand-operated waterjet lance as shown in FIG. 9.
Figure 11:
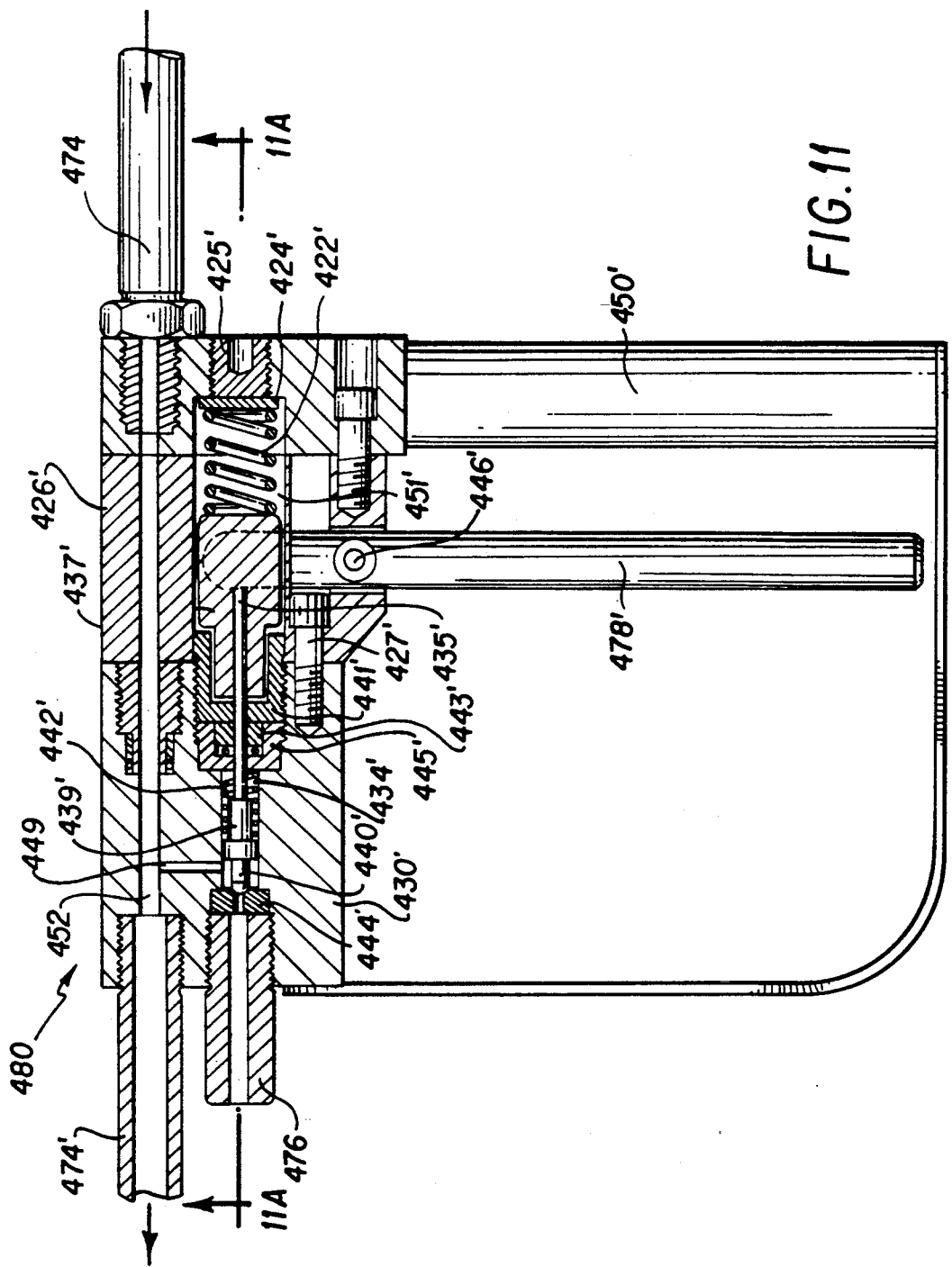
FIG. 11 is a partial cross-sectional view of a front dump valve of the dual hand-operated waterjet lance as shown in FIG. 9.
Figure 10A:
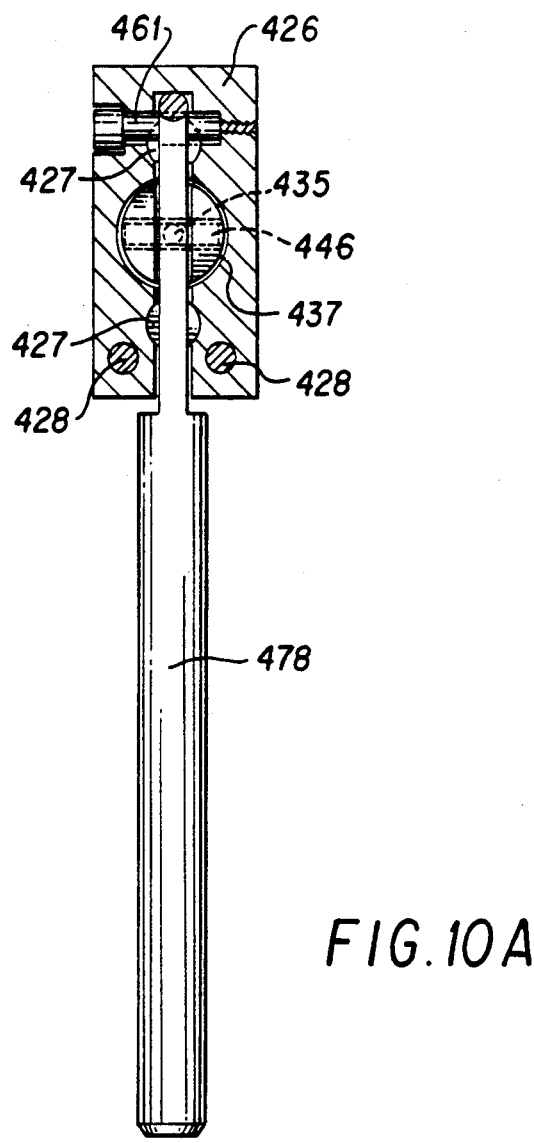
FIG. 10A is a partial cross-sectional view taken along line 10A—10A, as shown in FIG. 10.
Figure 11A:
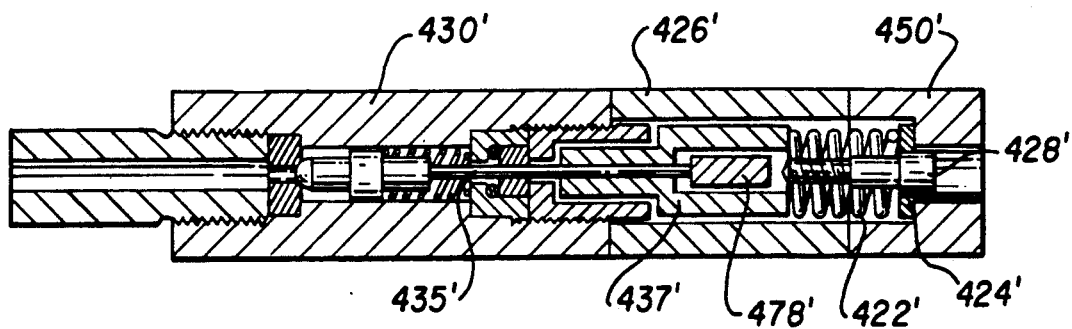
FIG. 11A is a partial cross-sectional view taken along line 11A—11A, as shown in FIG. 11.

FIG. 10 shows a partial cross-sectional view of rear closure valve 420, according to one preferred embodiment of this invention. FIG. 10A shows a partial cross-sectional view taken along line 10A—10A, as shown in FIG. 10. FIG. 11 shows a partial cross-sectional view of front momentary dump valve 480, also according to one preferred embodiment of this invention. FIG. 11A shows a partial cross-sectional view taken along line 11A—11A, as shown in FIG. 11. Referring to FIG. 10, rear closure valve 420 comprises many components similar to those shown in the closure valve part of the compound valve shown in FIG. 8. Cylindrical main valve cavity 434 is sealed at a downstream end with main valve seat 444 and is sealed at an upstream end with main seal cage 445. The main valve stem assembly is positioned within main valve cavity 434. The main valve stem assembly comprises removable main valve poppet 440, main stem collar 439, main stem spring 442 and main valve stem 435. Main valve stem 435 engages main valve stem anchor 437 and is secured in position with main set screw 438. Main valve stem anchor 43 is housed within cylindrical cavity 451 within adapter block 426. Main valve stem anchor 437 engages with a downstream end of main spring 422. An upstream end of main spring 422 is positioned adjacent main spring disk 424. Main adjusting bolt 425 is threaded within a portion of handle 450 and can be rotated to move main spring disk 424 in a direction parallel to the axis of main valve stem 435, and thus adjust the compression of main spring 422. Trigger 478 has a pivot end inside adapter block 426 and engages main valve stem anchor 437 through a slot and pin arrangement, as shown in FIG. 10A, so that pulling trigger 478 toward handle 450 further compresses main spring 422 and moves main valve stem 435 in an upstream direction, away from main valve seat 444, thus opening the main discharge port of main valve seat 444. Releasing trigger 478 with respect to handle 450 results in closing the main discharge port by seating main valve poppet 440 within main valve seat 444. To ensure a sealed closure, main spring 422 exerts a greater force on main valve stem 435 than the force exerted by the fluid within main valve cavity 434. Such requirement may be difficult to achieve at very high fluid pressures unless main valve stem 435 is intentionally designed with a relatively small diameter which results in fragile valve stems. Thus, this invention circumvents the need for very small valve stems.

Referring to FIG. 11, which shows one preferred embodiment of front momentary dump valve 480, the valve assembly comprises dump valve body 430', dump adapter block 426' and dump handle 450', assembled with outlet tube 474 and tie bolts 427'. Dump valve body 430' defines upper fluid passage 452 which is in communication with outlet tube 474 and secondary outlet tube 474'. Nozzle assembly 475, as shown in FIG. 9, is positioned at a downstream end of secondary outlet tube 474'. Crossover bleed channel 449 is in communication with dump valve cavity 434' and upper fluid passage 452, which is approximately parallel to dump valve cavity 434'. Dump valve cavity 434' is sealed at a downstream end by dump valve seat 444' and sealed at an upstream end by dump seal cage 445'. Dump stem seal 443' is housed within dump seal cage 445' which is mounted within dump valve body 430'. The dump valve stem assembly is positioned within dump valve cavity 434' and is free to slide in a linear direction, parallel to an axis of dump valve stem 435'. Likewise, the dump valve stem assembly comprises previously described components such as detachable dump valve poppet 440', dump stem collar 439', dump stem spring 442' and dump valve stem 435'. Dump valve stem 435' protrudes through the dump stem seal assembly and dump seal support 441'. Dump valve stem 435' is anchored within a central passage of dump valve stem anchor 437' which is positioned within cavity 451' of dump adapter block 426'. Dump valve stem anchor 437' abuts a downstream end of dump spring 422'. An upstream end of dump spring 422' abuts dump spring disk 424'. Dump adjusting bolt 425' is mounted within dump handle 450', similarly to those previously discussed, to move dump spring disk 424' in a linear direction, parallel to the axis of dump valve stem 435', for adjusting the compression of dump spring 422'.

Still referring to FIG. 11, dump valve stem anchor 437' has a slot which accommodates an upper end of dump trigger 478' which pivots about dump pivot pin 446'. Pulling dump trigger 478' toward dump handle 450' with a human hand exerts a force on dump valve stem anchor 437' and pushes dump valve stem 435' toward dump valve seat 444', causing the dump discharge port of dump valve poppet 440' to close. The diameter of dump valve stem 435' near dump stem seal 443' is intentionally greater than the diameter of the contact circle between dump valve poppet 440' and dump valve seat 444'. Through the arrangement of this preferred embodiment, the forces exerted by the pressurized fluid within dump valve cavity 434' are always greater than the forces exerted on dump valve poppet 440' for seating dump valve poppet 440' against dump valve seat 444'. Furthermore, the fluid forces exerted on dump valve stem 435' are always greater than the forces from dump spring 422'. Thus, the dump discharge port of dump valve seat 444' can be closed only by forcing dump trigger 478' toward dump handle 450', when the pressurized fluid is within dump valve cavity 434'. Furthermore, releasing dump trigger 478' will always cause the dump discharge port to open. Dump adjusting bolt 425' allows adjustment of the force of dump spring 422' to ensure that such spring force is in proper relationship with the water forces. With crossover bleed channel 449, dump valve cavity 434' is in communication with main valve cavity 434 of rear closure valve 420, as shown in FIG. 10. Thus, opening the dump discharge port and discharging fluid to the atmosphere through dump tube 476, as shown in FIG. 11, will quickly cause the fluid pressure within main valve cavity 434 of rear closure valve 420 to drastically be reduced. At such moment, main spring 422, as shown in FIG. 10, will spring into action and result in closure of rear closure valve 420. It is apparent that the human hand on rear closure valve 420 must release trigger 478 of rear closure valve 420 to allow main spring 422 to act.

The advantage of combined front momentary dump valve 480 and rear closure valve 420 according to this particular embodiment of the invention is realized by an example quantifying the forces involved to operate an on-off valve. Referring to FIG. 10, and considering rear closure valve 420 as a complete, independent flow control valve, consider main valve stem 435 having a diameter at the main seal assembly of 0.125", and the main valve discharge port of main valve seat 444 also having a diameter of 0.125" at the poppet seating circle. At a water pressure of 30,000 psi, there will be a force of about 368 $lb_f$ exerted on main valve poppet 440 enclosing the main discharge port and a same force of about 368 $lb_f$ in pushing main valve stem 435 upstream toward trigger 478 and main spring 422. With such arrangement, main valve stem 435 will not move and the main discharge port will be closed due to the spring force, which can be assumed to be a value of about 50 $lb_f$. To open the outlet port of the closure valve requires about 10 $lb_f$ applied by the human hand in pulling trigger 478 against handle 450, with trigger 478 being about 5" long. Holding the valve open will be easier than opening the valve according to the embodiment as shown in FIG. 4 since the force of the pressurized water works in the same direction. However, releasing trigger 478 results in releasing the human hand force against main spring 422, but the 50 $lb_f$ force from main spring 422 is too small to overcome the 368 $lb_f$ force from the pressurized water on main valve stem 435. Achieving a 368 $lb_f$ force from a relatively small diameter spring is not practical and conventional springs of such required diameter cannot provide such magnitude of force. Even if such spring was conventionally available and installed in the valve assembly according to this invention, the high magnitude of the spring force would complicate the opening process of the valve as the human hand must further compress the spring in order to open the main discharge port.

To overcome such disadvantage, it appears apparent to reduce the diameter of main valve stem 435. For example, reducing the diameter of main valve stem 435 to approximately 0.063" would reduce the force from the 30,000 psi pressurized water on main valve stem 435 to about 94 $lb_f$ which is readily available from 1" diameter conventional die springs. However, if the main discharge port remains at 0.125" in diameter, the seating force from the pressurized water will be 274 $lb_f$ (368 $lb_f$—94 $lb_f$) greater than pushing force, which means that an additional 274 $lb_f$ must be provided by the human hand to open the valve outlet. This is a difficult task. Again, it would seem apparent to reduce the diameter of the main discharge port to about 0.063" even though such reduction would result in an increased pressure drop of the fluid through the main discharge port. However, by reducing the diameter of the main discharge port to approximately 0.063", it is possible that rear closure valve 420 can be constructed to handle water at pressures up to 30,000 psi. The only remaining disadvantage is poor reliability of such valve since a 0.063" diameter main valve stem 435 cannot tolerate stresses associated with above normal push and pull motions and thus will easily break. Once main valve stem 435 is broken, the main discharge port will remain open, thus creating an unsafe condition. However, the combination of rear closure valve 420 and front momentary dump valve 480, according to this invention, overcomes such disadvantages.

Referring to FIG. 11, front momentary dump valve 480 functions differently from rear closure valve 420 since the human hand force is applied to assist dump spring 422' in pushing dump valve stem 435' within dump valve cavity 434'. The total force required to seat dump valve poppet 440' against dump valve seat 444' is just slightly greater than the water force pushing on dump valve stem 435'. If dump valve stem 435' has a diameter of 0.078", the water pushing force against dump valve stem 435', at 30,000 psi, is about 144 $lb_f$. Thus, if the human hand and dump spring 422' have a total force of 145 $lb_f$, the dump discharge port will be closed. Such 145 $lb_f$ can be readily provided by dump handle 450' with dump trigger 478' 5" long and a relatively small die spring. If the dump discharge port has a diameter of 0.070", releasing dump trigger 478' will result in an opening of the dump discharge port. As soon as the dump discharge port is opened, the fluid pressure within the entire valve assembly will instantly drop. The exact pressure drop will depend on the flow rate of the fluid through the valve. If the flow rate is about three gallons per minute, at 30,000 psi, opening the 0.070" diameter dump discharge port will reduce the pressure within the valves to about 1,000 psi. This implies that main spring 422 of rear closure valve 420 only has 1,000 psi fluid pressure to work against, instead of 30,000 psi. Consequently, a 50 $lb_f$ spring force would be more than adequate to move a 0.125" diameter main valve stem 435. The immediate advantage of this invention is to allow the use of relatively stout closure valve stems without having to use relatively large springs. As a result, the reliability of the closure valve is tremendously improved. Once the discharge port of the closure valve is closed, the fluid supply to front momentary dump valve 480 is shut off and the fluid pressure within dump valve cavity 434' dissipates. Thus, releasing dump trigger 478' causes the dump discharge port to be closed by dump valve poppet 440'. The entire valve assembly is then ready to repeat the work cycle.

EXAMPLE I

According to this invention as shown in FIG. 1, a fast-actuating fluid on-off valve has been tested. Valve body 30 had dimensions of 2" wide, 3" long and 1" thick and was constructed of stainless steel. Valve body 30 had one side fluid inlet 31 threaded to accommodate a ⅜" diameter high pressure stainless steel tube with appropriate tube fittings. A cylindrical valve cavity 34 was 0.312" in diameter and had an upper threaded cavity to accommodate seal cage 45 and seal support 41, and a lower end fluid outlet 32 threaded cavity to accommodate a disk shaped valve seat 44 and a threaded outlet adapter 33. Above cavity 34 and the upper central hole was a smooth bore, cylindrical seal cavity and a cylindrical threaded cavity which accommodated a threaded seal support 41. Cavity 34 had a vertical length of 1.3" and the cavity within stem seal 43 had a diameter of 0.312" and a depth of 0.300". The threaded upper cavity for seal support 41 had a depth of about 0.450" and a diameter of about 0.5".

Pneumatic actuator 25 with a cylindrical external shape was connected to valve body 30 with actuator adapter 26. The housing of pneumatic actuator 25 was made of an aluminum alloy and had a stainless steel piston 28 of 2.500" in diameter, dividing the cylindrical interior of the actuator into an upper chamber portion and a lower chamber portion, each having a threaded port for connection of an air tube. Piston 28 was equipped with a seal so that the upper and lower chamber portions of the actuator interior were sealed in an air tight manner. Piston 28 was able to slide up and down for a maximum distance of about 0.375". Piston 28 had a central piston rod 29 of 0.750" in diameter. The upper end of piston rod 28 was in contact with a relatively stiff compression spring 22 which constantly exerted a downward force against piston rod 29. The spring rate of compression spring 22 was increased or decreased by selecting springs having different wire sizes. Spring 22 was positioned in a recess, about 0.800" in diameter, of a plastic damper 23 which served as the stopper for piston 28. Piston 28 had an upper "valve closing" surface area of 4.91 square inches and a lower "valve opening" surface area of 4.49 square inches. The downstream end of piston rod 29 had a threaded cavity to accommodate valve stem anchor 37, which was constructed of stainless steel and had a central hole of 0.094" in diameter, and a side threaded hole to accommodate externally threaded set screw 38. Valve stem anchor 37 accommodated a round and smooth valve stem 35 of about 2.5" in length and 0.0937" in diameter, which was constructed of hardened stainless steel having a tensile strength in excess of 150,000 psi. Valve stem 35 had an upstream end with a flat for engaging set screw 38 and stem shoulder 36 at the opposite end with a shoulder diameter of about 0.130" and 0.125" in length. Valve stem 35 was capable of lifting a weight of 1,000 $lb_f$ without breaking. Valve stem anchor 37 had a cylindrical lower end of about 0.375" in diameter which was positioned tightly within a cylindrical bore of seal support 41, but yet free to slide up and down within such cylindrical bore. Stem seal 43 was made of a polymer material and capable of withstanding water pressure in excess of 60,000 psi.

The end of valve stem 35 with stem shoulder 36 was situated inside cavity 34. A cylindrical, hollow stem collar 39 tied valve stem 35 to a ball poppet. Stem collar 39 was constructed of stainless steel and about 0.600" long. Stem shoulder 36 was free to slide within stem collar 39 along a vertical distance of about 0.250". The upstream end of stem collar 39 was in contact with stem spring 42, which slid over valve stem 35, and was constructed of stainless steel wire about 0.025" in diameter. Stem spring 42 constantly exerted a downward force against stem collar 39 such that the ball poppet always maintained a low position with respect to valve stem 35. Without fluid inside valve body 30, the ball poppet contacted a circular valve seat and closed the discharge port of valve seat 44. Valve seat 44 was about 0.563" in diameter and had a central hole of about 0.094" in diameter. Valve seat 44 had a tapered upper entrance such that when ball poppet contacted valve seat 44, the diameter of the contact area circle was 0.125". The contact area circle diameter is best generally illustrated in FIG. 2, and was used to determine the seating force of the ball poppet, which was induced by the pressurized working fluid. With piston 28 at its lowest position, the ball poppet closed the discharge port of valve seat 44 and valve stem 35 was at its lowest position where stem shoulder 36 was situated, at about a middle position within stem collar 39. Stem shoulder 36 did not touch either the ball poppet or an upstream end of stem collar 39. There was a clearance of about 0.100" below stem shoulder 36. When compressed air was introduced into pneumatic actuator 25 to raise piston 28, valve stem 35 rose and stem shoulder 36 engaged stem collar 39 to lift it upward until piston 28 stopped, thus opening the discharge port of valve seat 44.

When compressed air at 70 psi was applied to pneumatic actuator 25, it generated a downward force of about 340 lb$_f$. If water at 30,000 psi was introduced into valve assembly 20, the water would have pushed the valve stem 35 upward and the ball poppet downward. The magnitude of the lifting force of valve stem 35 equals the product o the water pressure and the cross-sectional area of valve stem 35, or 208 lb$_f$. The hold down force on the ball poppet equals the product of the water pressure and the cross-sectional area of the contact circle of the ball poppet and valve seat 44, or 368 lb$_f$. Thus, there was a net hold down force for the ball poppet, or valve closing force of about 160 lb$_f$(368 lb$_f$−208 lb$_f$). Thus to open valve assembly 20 at 30,000 psi water pressure, a lifting force greater than 160 lb$_f$ had to be applied to valve stem 35. 70 psi of compressed air applied to pneumatic actuator 25 generated a lifting force sufficiently larger than that required to open valve assembly 20.

Once valve assembly 20 was opened, 30,000 psi water pressure exerted a constant force of 208 lb$_f$ against valve stem 35 and the hold down force for the ball poppet was overcome. Thus, piston 28 was subjected to a lifting force of 518 lb$_f$ (310 lb$_f$+208 lb$_f$). As previously explained, such force was cushioned to avoid damage to piston 28. Again, the cushion was supplied by spring 22 and a needle valve installed at the exhaust of the air control valve that allows the exhaust air from the upper chamber portion of the actuator to slowly escape, thus providing back pressure against the lifting of piston 28. The needle valve was simply a tuned orifice.

To close valve assembly 20, 70 psi of compressed air was introduced into the upper chamber portion of pneumatic actuator 25, to push piston 28 in a downstream direction. As valve stem 35 moved downward, stem collar 39 and valve poppet 40 were constantly in an extended position due to the downward force of stem spring 42. The ball poppet contacted valve seat 44 and sealed the discharge port before valve stem 35 reached its lowest position. As previously stated, the lengths of valve stem 35 and stem collar 39 were designed such that stem shoulder 36 never touched the top of valve poppet 40. Thus, forces from pneumatic actuator 25, during closure of valve assembly 20, were never transmitted to valve seat 44 and thus did not cause bending stresses in valve stem 35. Valve seat 44 was constructed of hardened stainless steel and polished on an upper side to provide a fluid-tight seal against valve body 30. Since the ball poppet first made contact with valve seat 44 under the downward force of stem spring 42, there was hardly any impact against valve seat 44. Such interaction defines the phrase "soft closure" which is used to describe the action of the valve according to this invention. Once the ball poppet was properly seated against the discharge port of valve seat 44, the sealing or closure of the discharge port was completed by forces from the pressurized fluid. Valve stem 35 did not contribute to the valve closing once it travelled downward enough to allow the ball poppet to seat. This is a very important aspect of this invention since such aspect prolongs the useful life o the components, particularly valve stem 35, valve poppet 40 and valve seat 44, the three most critical components of any fluidic on-off valve.

EXAMPLE II

A manually operated on-off valve, as shown in FIG. 4, was constructed for water jetting applications. Valve body 30 was constructed of stainless steel and had dimensions of 2.0"×2.6", and a thickness of 0.75". Instead of pneumatic actuator 25, handle 50 and a handle adapter were attached to valve body 30 with two ¼" diameter tie bolts 27. Both handle adapter 55 and handle 50 were made of an aluminum alloy. Handle adapter 55 had a dimension of 2.0"×1.6", and a thickness of 0.75". Handle adapter 55 had a central cylindrical bore of 0.630" in diameter, to accommodate a cylindrical valve stem anchor 37 which was connected to an upstream end of valve stem 35 and fixed with respect to valve stem anchor 37. Valve stem anchor 37 had two side holes for anchoring two short studs which served as a valve stem anchor trunnion: The two trunnions extended out of handle adapter 55 through two windows or slots within handle adapter 55 and were engaged with trigger fork 58, so that pulling valve trigger 60 against handle 50 caused valve stem anchor 37 to side upstream. Valve stem anchor 37 was generally cylindrical in form and had a smaller front end of 0.375" in diameter and a larger rear end of 0.62" in diameter. The front end of valve stem anchor 37 slid inside a cylindrical recess of seal support 41. The rear end of valve stem anchor 37 slid inside the base of handle adapter 55. A compression stem anchor spring 57 was positioned against the rear end of valve stem anchor 37 to exert a force in a direction from upstream to downstream.

Handle 50 was about 7" long. One compression spring 59 was positioned at a lower end of handle 50, for exerting a force from handle 50 to valve trigger 60. Valve trigger 60 had a pivot on top of trigger fork 58. The distance between the pivot and the valve stem anchor trunnion was 1.0" and the distance between the pivot to the location of trigger spring 59 was about 6.0". Such arrangement provided a lever action so that the force exerted on valve trigger 60 by trigger spring 59 was transmitted to valve stem anchor 37 and thus to valve stem 35, in amplified fashion, to form an increase in magnitude by a factor of approximately 6.0. Such lever action was advantageous since a relatively weak trigger spring 59 generated a much greater force to operate the valve. Trigger spring 59 had a threaded stud situated in handle 50 to allow adjustment of spring force against valve trigger 60.

Normally, valve stem 35 is forced in a downstream direction by spring actions and the ball poppet thus closes the fluid discharge port within valve seat 44. Since the valve was pulled by human hand against handle 50, valve stem 35 was pulled from a downstream position to an upstream position and thus caused valve poppet 40 to open the fluid discharge port of valve seat 44. Thus, the valve was a hand-operated instant on-off valve for fluid operations. In this example, outlet adapter 33 was connected to a stainless steel tube with a nozzle on its other end for generating a water jet to perform cleaning and material-removing operations. Fluid inlet 31 of valve body 30 was connected to a fitting of a high pressure hose through which pressurized water was introduced into cavity 34. At 10,000 psi, the water exerted a force of about 123 lb$_f$ against the valve poppet for closing the discharge port, and a force of about 70 lb$_f$ against valve stem 35. Thus, there was a net valve closure or poppet hold down force of about 53 lb$_f$ (123 lb$_f$ − 70 lb$_f$). To open the valve a force of greater than 53 lb$_f$ was applied to pull valve stem 35 from a closed to open position. However, such force was significantly greater than 53 lb$_f$ because of the spring forces which had to be overcome. In such example, stem spring 57 was actually for cushioning valve stem anchor 37 and was estimated at not more than 10 lb$_f$ against valve stem anchor 37, in a closed position of the valve. Trigger spring 59 was estimated to exert 15 lb$_f$ against valve trigger 60, which translates to about 90 lb$_f$ on valve stem 35, from an upstream position to a downstream position. Thus, if a human hand was positioned at the end of valve trigger 60, a hand force of approximately 25 lb$_f$ to 30 lb$_f$ was necessary to overcome the spring forces and poppet hold down forces, and thus open the fluid discharge port of valve seat 44. Once the port was opened, the poppet hold down force from the 10,000 psi water was overcome, and the water provided 70 lb$_f$ to push valve stem 35 in an upstream direction. As a result, the hand force required to keep the valve open was some operator fatigue. However, at higher operating pressures, such fatigue would be amplified. To close the valve, trigger 60 was released and the two springs provided a force greater than 70 lb$_f$ against valve stem 35 to overcome the force from the 10,000 psi water. Thus, it was advantageous to have spring 59 at the end of valve trigger 60 since a relatively small spring provided the necessary force to close the valve. In conventional valves of this type, a single spring positioned behind the valve stem anchor has an axial relationship with the valve stem. In such conventional valves, the spring must be fairly large and made of wire having a relatively large diameter. As a result, the size and weight of the valve body must be fairly large and operator fatigue in using such conventional valve becomes a great concern.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A hand-operated high pressure on-off valve comprising:

a valve body defining a sealed main valve cavity and a sealed dump valve cavity, a fluid inlet in communication with said main valve cavity, a main valve seat defining a main discharge port, said main valve seat sealably mounted within said main valve cavity at a downstream cavity end of said main valve cavity, a dump valve seat defining a dump discharge port, said dump valve seat mounted within said dump valve cavity at a downstream dump end of said dump valve cavity, said main discharge port in communication with a crossover bleed channel which is in communication with said dump valve cavity;

a main valve stem, a main valve poppet, main engagement means for engaging said main valve stem with said main valve poppet to force said main valve poppet against and away from said main valve seat, a dump valve stem, a dump valve poppet, dump engagement means for engaging said dump valve stem against and away from said dump valve seat;

an adapter block defining a trigger channel, said adapter block secured to said valve body, a trigger pivotally mounted within said trigger channel, a handle secured to said valve body; and operating means for simultaneously moving said main valve stem and said dump valve stem so that when said main valve poppet is seated within said main valve seat said dump valve poppet is seated within said dump valve seat, when said main valve poppet is moved away from said main valve seat said dump valve poppet remains seated within said dump valve seat, and when said main valve poppet is returned to a seated position said dump valve is moved upstream from said dump valve seat by fluidic forces.

2. A hand operated high pressure on-off valve according to claim 1 wherein said main valve cavity and said dump valve cavity are within one said valve body.

3. A hand operated high pressure on-off valve according to claim 1 further comprising:

a main seal cage defining a main cage through hole, said main seal cage mounted within said valve body adjacent a main upstream end of said main valve cavity, a main stem seal defining a main seal through hole, said main stem seal mounted within said main seal cage, said main valve stem extending through said main cage through hole and said main seal through hole, a main seal support defining a main seal support cavity and a main support through hole, said main seal support mounted within said valve body upstream of said main seal cage, a main valve stem anchor defining a main anchor through hole, said main valve stem extending through said main support through hole and secured within said main anchor through hole;

a dump seal cage defining a dump cage through hole, said dump seal cage mounted within said valve body adjacent a dump upstream end of said dump valve cavity, a dump stem seal defining a dump seal through hole, said dump stem seal mounted within said dump seal cage, said dump valve stem extending through said dump cage through hole and said dump seal through hole, a dump seal support defining a dump seal support cavity and a dump support through hole, said dump seal support mounted within said valve body upstream of said dump seal cage, a dump valve stem anchor defining a dump anchor through hole, said dump valve stem extending through said dump support through hole and secured within said dump anchor through hole.

4. A hand operated high pressure on-off valve according to claim 3 wherein said main valve stem anchor is secured to said main valve stem with a main set screw mounted within said main valve stem anchor and engageable with a flat surface of said main valve stem.

5. A hand operated high pressure on-off valve according to claim 3 wherein said dump valve stem anchor is secured to said dump valve stem with a dump set screw mounted within said dump valve stem anchor and engageable with a flat surface of said dump valve stem.

6. A hand operated high pressure on-off valve according to claim 3 wherein said main valve stem anchor further defines a main anchor slot, said dump valve stem anchor further defines a dump anchor slot, and said trigger extends within said dump anchor slot and is pivotally mounted within said main anchor slot.

7. A hand operated high pressure on-off valve according to claim 3 further comprising a compressible main O-ring mounted within said main seal support cavity adjacent a downstream stem seal end of said main stem seal.

8. A hand operated high pressure on-off valve according to claim 3 further comprising a compressible dump O-ring mounted within said dump seal support cavity adjacent a downstream stem seal end of said dump stem seal.

9. A hand operated high pressure on-off valve according to claim 1 wherein said operating means further comprises: a main spring mounted within a main block cavity of said adapter block, a main downstream end of said main spring abutting an upstream main anchor portion of said main valve stem anchor and a main downstream end of said main spring abutting a main spring disk mounted within said main block cavity, and an externally threaded main adjusting bolt mounted within said handle engageable with said main spring disk.

10. A hand operated high pressure on-off valve according to claim 1 wherein said operating means further comprises: a dump spring mounted within a dump block cavity of said adapter block, a dump downstream end of said dump spring abutting an upstream dump anchor portion of said dump valve stem anchor and a dump downstream end of said dump spring abutting a dump spring disk mounted within said dump block cavity, and an externally threaded dump adjusting bolt mounted within said handle engageable with said dump spring disk.

11. A hand operated high pressure on-off valve according to claim 1 wherein said main engagement means further comprise: a main stem collar mounted within said main valve cavity, said main valve poppet secured to a downstream main collar end of said main stem collar, said main valve stem forming a main stem shoulder mounted within and engageable with said main stem collar, and a main stem spring mounted within said main valve cavity forcing said main seal cage in a downstream direction when the on-off valve is in an at rest position.

12. A hand operated high pressure on-off valve according to claim 1 wherein said dump engagement means further comprise: a dump stem collar mounted within said dump valve cavity, said dump valve poppet secured to a downstream dump collar end of said dump stem collar, said dump valve stem forming a dump stem shoulder mounted within and engageable with said dump stem collar, and a dump stem spring mounted within said dump valve cavity forcing said dump seal cage in a downstream direction when the on-off valve is in an at rest position.

13. A hand operated high pressure on-off valve according to claim 1 further comprising a discharge seal mounted within said valve body downstream of said main valve seat.

14. A hand-operated high pressure on-off valve comprising:
a main valve body defining a sealed main valve cavity, a dump valve body defining a sealed dump valve cavity, a fluid inlet in communication with said main valve cavity, a main valve seat defining a main discharge port, said main valve seat sealably mounted within said main valve cavity at a downstream cavity end of said main valve cavity, a dump valve seat defining a dump discharge port, said dump valve seat mounted within said dump valve cavity at a downstream dump end of said dump valve cavity, said main discharge port in communication with a crossover bleed channel which is in communication with said dump valve cavity;
a main valve stem, a main valve poppet, main engagement means for engaging said main valve stem with said main valve poppet to force said main valve poppet against and away from said main valve seat, a dump valve stem, a dump valve poppet, dump engagement means for engaging said dump valve stem against and away from said dump valve seat; and
a main adapter block defining a main trigger channel, said main adapter block secured to said main valve body, a main trigger pivotally mounted within said main trigger channel, a main handle secured to said main valve body, main operating means for selectively forcing said main valve poppet against and away from said main valve seat, a dump adapter block defining a dump trigger channel, said dump adapter block secured to said dump valve body, a dump trigger pivotally mounted within said dump trigger channel, a dump handle secured to said dump body, and dump operating means for selectively forcing said dump value poppet against and away from said dump valve seat.

15. A hand-operated high pressure on-off valve according to claim 14 wherein said dump valve body defines a dump fluid passage in communication with a dump outlet conduit mounted to said dump valve body, said main discharge port is in communication with a main outlet conduit mounted between said main valve body and said dump valve body, said main outlet conduit is in communication with said dump fluid passage, and said crossover bleed channel is in communication between said dump fluid passage and said dump valve cavity.

16. A hand-operated high pressure on-off valve according to claim 14 further comprising:
a main seal cage defining a main cage through hole, said main seal cage mounted within said main valve body adjacent a main upstream end of said main valve cavity, a main stem seal defining a main seal through hole, said main stem seal mounted within said main seal cage, said main valve stem extending through said main cage through hole and said main seal through hole, a main seal support defining a main seal support cavity and a main support through hole, said main seal support mounted within said main valve body upstream of said main seal cage, a main valve stem anchor defining a main anchor through hole, said main valve stem extending through said main support through hole and secured within said main anchor through hole;
a dump seal cage defining a dump cage through hole, said dump seal cage mounted within said dump valve body adjacent a dump upstream end of said dump valve cavity, a dump stem seal defining a dump seal through hole, said dump stem seal mounted within said dump seal cage, said dump valve stem extending through said dump cage through hole and said dump seal through hole, a dump seal support defining a dump seal support cavity and a dump support through hole, said dump seal support mounted within said dump valve body upstream of said dump seal cage, a dump valve stem anchor defining a dump anchor through hole, said dump valve stem extending through said dump support through hole and secured within said dump anchor through hole.

17. A hand-operated high pressure on-off valve according to claim 16 wherein said main valve stem anchor is secured to said main valve stem with a main set screw mounted within said main valve stem anchor and engageable with a flat surface of said main valve stem.

18. A hand-operated high pressure on-off valve according to claim 16 wherein said dump valve stem anchor is secured to said dump valve stem with a dump set screw mounted within said dump valve stem anchor and engageable with a flat surface of said dump valve stem.

19. A hand-operated high pressure on-off valve according to claim 16 wherein said main valve stem anchor further defines a main anchor slot, and said main trigger extends within said main anchor slot and is pivotally mounted with respect to said main adapter block.

20. A hand-operated high pressure on-off valve according to claim 16 wherein said dump valve stem anchor defines a dump anchor slot, and said dump trigger extends within said dump anchor slot and is pivotally mounted with respect to said dump adapter block.

21. A hand-operated high pressure on-off valve according to claim 16 further comprising a compressible main O-ring mounted within said main seal support cavity adjacent a downstream stem seal end of said main stem seal.

22. A hand-operated high pressure on-off valve according to claim 16 further comprising a compressible dump O-ring mounted within said dump seal support cavity adjacent a downstream stem seal end of said dump stem seal.

23. A hand-operated high pressure on-off valve according to claim 14 wherein said main operating means further comprises: a main spring mounted within a main block cavity of said main adapter block, a main downstream end of said main spring abutting an upstream main anchor portion of said main valve stem anchor and a main downstream end of said main spring abutting a main spring disk mounted within said main block cavity, and an externally threaded main adjusting bolt mounted within said main handle engageable with said main spring disk.

24. A hand-operated high pressure on-off valve according to claim 14 wherein said dump operating means further comprises: a dump spring mounted within a dump block cavity of said dump adapter block, a dump downstream end of said dump spring abutting an upstream dump anchor portion of said dump valve stem anchor and a dump downstream end of said dump spring abutting a dump spring disk mounted within said dump block cavity, and an externally threaded dump adjusting bolt mounted within said dump handle engageable with said dump spring disk.

25. A hand-operated high pressure on-off valve according to claim 14 wherein said main engagement means further comprise: a main stem collar mounted within said main valve cavity, said main valve poppet secured to a downstream main collar end of said main stem collar, said main valve stem forming a main stem shoulder mounted within and engageable with said main stem collar, and a main stem spring mounted within said main valve cavity forcing said main seal cage in a downstream direction when the on-off valve is in an at rest position.

26. A hand-operated high pressure on-off valve according to claim 14 wherein said dump engagement means further comprise: a dump stem collar mounted within said dump valve cavity, said dump valve poppet secured to a downstream dump collar end of said dump stem collar, said dump valve stem forming a dump stem shoulder mounted within and engageable with said dump stem collar, and a dump stem spring mounted within said dump valve cavity forcing said dump seal cage in a downstream direction when the on-off valve is in an at rest position.

27. A hand-operated high pressure on-off valve comprising:

at least one valve body defining a sealed main valve cavity and a sealed dump valve cavity, a fluid inlet in communication with said main valve cavity, a main valve seat defining a main discharge port, said main valve seat sealably mounted within said main valve cavity at a downstream cavity end of said main valve cavity, a dump valve seat defining a dump discharge port, said dump valve seat mounted within said dump valve cavity at a downstream dump end of said dump valve cavity, said main discharge port in communication with a crossover bleed channel which is in communication with said dump valve cavity;

a main valve stem, a main valve poppet, main engagement means for engaging said main valve stem with said main valve poppet to force said main valve poppet against and away from said main valve seat, a dump valve stem, a dump valve poppet, dump engagement means for engaging said dump valve stem against and away from said dump valve seat;

at least one adapter block each defining a trigger channel, each said adapter block secured to a corresponding said valve body, a trigger pivotally mounted within said trigger channel, a handle secured to each said valve body; and operating means for selectively moving said main valve poppet into and out of said main valve seat and moving said dump valve poppet into and out of said dump valve seat.

* * * * *